US008606232B2

(12) United States Patent
Siu et al.

(10) Patent No.: US 8,606,232 B2
(45) Date of Patent: Dec. 10, 2013

(54) METHOD AND SYSTEM FOR PERFORMING MULTI-STAGE VIRTUAL SIM PROVISIONING AND SETUP ON MOBILE DEVICES

(75) Inventors: Ta-yan Siu, San Diego, CA (US); Guangming Shi, San Diego, CA (US); Venkat Tangirala, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 424 days.

(21) Appl. No.: 12/480,524

(22) Filed: Jun. 8, 2009

(65) Prior Publication Data
US 2010/0311391 A1   Dec. 9, 2010

(51) Int. Cl.
*H04M 1/66* (2006.01)
*H04M 3/00* (2006.01)

(52) U.S. Cl.
USPC ........ 455/411; 455/414; 455/558; 455/414.2; 455/414.4; 455/432.1

(58) Field of Classification Search
USPC ......... 455/411, 418, 414.2, 414.4, 558, 432.1
See application file for complete search history.

(56) References Cited

U.S. PATENT DOCUMENTS

| | | | |
|---|---|---|---|
| 7,685,631 B1 * | 3/2010 | Paya et al. | 726/8 |
| 7,925,245 B1 * | 4/2011 | Soelberg et al. | 455/414.4 |
| 2004/0242209 A1 * | 12/2004 | Kruis et al. | 455/414.1 |
| 2005/0124288 A1 | 6/2005 | Karmi et al. | |
| 2006/0039564 A1 * | 2/2006 | Rao | 380/270 |
| 2007/0015538 A1 * | 1/2007 | Wang | 455/558 |
| 2008/0051062 A1 * | 2/2008 | Lee | 455/411 |
| 2008/0254766 A1 | 10/2008 | Craven | |
| 2009/0077643 A1 * | 3/2009 | Schmidt et al. | 726/6 |

(Continued)

FOREIGN PATENT DOCUMENTS

| | | |
|---|---|---|
| EP | 2076071 A1 | 7/2009 |
| JP | 2003091679 A | 3/2003 |
| KR | 20080021178 A | 3/2008 |

OTHER PUBLICATIONS

Ericsson: "Architecture Modifications and Alternatives for Remote Management of USIM Application on M2M Equipment", 3GPP Draft; S3_080163_PCR_TR33812_Funcarch, 3rd Generation Partnership Project (3GPP), Mobile Competence Centre; 650, Route des Lucioles; F-06921 Sophia-Antipolis Cedex; France, vol. SAWG3, No. Sanya; 20080218, Feb. 18 2008, XP050280533, [retrieved on Feb. 18, 2008].

(Continued)

*Primary Examiner* — Jinsong Hu
*Assistant Examiner* — Jean Chang
(74) *Attorney, Agent, or Firm* — James T. Hagler

(57) ABSTRACT

A system and method for provisioning a mobile device with user preferences and settings. The user preferences and settings may be default preferences and settings selected by the various applications loaded onto the mobile device or previously user preferences and settings selected by a user. User selected preferences and settings may be stored in a remote server memory. The preferences and settings may be retrieved by new mobile device. The preferences and settings stored in the remote server memory may contain triggers which initiate a connection with various third party servers. In response to the trigger, various third party servers may transmit further instructions to the mobile device which allows the mobile device to complete the restoration of the user's preferences and settings.

22 Claims, 12 Drawing Sheets

(56) References Cited

U.S. PATENT DOCUMENTS

| | | | |
|---|---|---|---|
| 2009/0253409 A1* | 10/2009 | Slavov et al. | 455/411 |
| 2010/0029247 A1* | 2/2010 | De Atley et al. | 455/411 |
| 2010/0062808 A1* | 3/2010 | Cha et al. | 455/558 |
| 2010/0093396 A1* | 4/2010 | Roundtree | 455/558 |
| 2010/0192212 A1* | 7/2010 | Raleigh | 726/7 |
| 2010/0235476 A1* | 9/2010 | Lin et al. | 709/219 |
| 2010/0287231 A1* | 11/2010 | Hughes et al. | 709/203 |
| 2011/0265158 A1* | 10/2011 | Cha et al. | 726/6 |

OTHER PUBLICATIONS

International Search Report and Written Opinion—PCT/US2010/037810—ISA/EPO—Dec. 15, 2010.

* cited by examiner

METHOD AND SYSTEM FOR PERFORMING MULTI-STAGE VIRTUAL SIM PROVISIONING AND SETUP ON MOBILE DEVICES

FIELD OF INVENTION

The present invention relates generally to cellular telephone technologies, and more particularly to a system and method for remotely storing and enabling cellular telephone provisioning and setting information.

BACKGROUND OF INVENTION

Mobile devices have increasingly become much more than simply mobile voice communication stations. Today's mobile devices are capable of operating as a platform to play music, view pictures and video, browse the Internet, send and receive short message service (SMS) and e-mail messages, play games, and much more. Users are able to personalize their mobile devices by implementing various preferences and settings which may include setting ring tones, wallpapers, volume, brightness, and contrast settings, as well as loading unique third party application software and/or data. Consequently, mobile devices often have settings stored in their local memory associated with such preferences and application settings. In addition, mobile device local memory may store personal user settings. For example, mobile device local memory may contain bookmarks or hyperlinks to various Internet pages or data storage IP addresses. Alternatively, passwords or authentication certificates or credentials may be stored in local memory for use in communicating with various servers.

Users often upgrade their mobile devices to take advantage of new feature sets offered in new mobile device models. Replacing a mobile device can be a troublesome process for most users. The new mobile device must be programmed with the appropriate software and data to support wireless communications. Also user data and settings stored in local memory must be ported to the new mobile device to effectuate all of the user's previous preferences and settings. While a mobile device may be programmed with the appropriate software and data to support wireless communications over the air (OTA), all of the data and settings stored in local memory must be manually ported over to the new mobile device.

Consequently, a system and method is desired to allow users to more easily port the provisioning data as well as personal data and settings traditionally stored in a mobile device local memory to another mobile device.

SUMMARY

Various embodiments provide a method for restoring a user's preferences and settings to a new mobile device. Provisioning data stored in a remote server memory is accessed by the new mobile device and downloaded into local memory. Included in the provisioning data are triggers which instruct the remote server to transmit an activation message to various third party servers which each contain data or executable files for use on the mobile device. The third party server in response to the received activation message transmits instructions to the remote server and ultimately the mobile device to instruct the mobile device to establish a communication link with the third party server and download a third party data file. Once the download is complete, the mobile device may complete the restoration of the user's settings and preferences by executing the instructions of the third party server and using the downloaded third party data file.

BRIEF DESCRIPTION OF THE DRAWINGS

The accompanying drawings, which are incorporated herein and constitute part of this specification, illustrate embodiments of the invention, and, together with the general description given above and the detailed description given below, serve to explain features of the invention.

DETAILED DESCRIPTION

Figure 1:
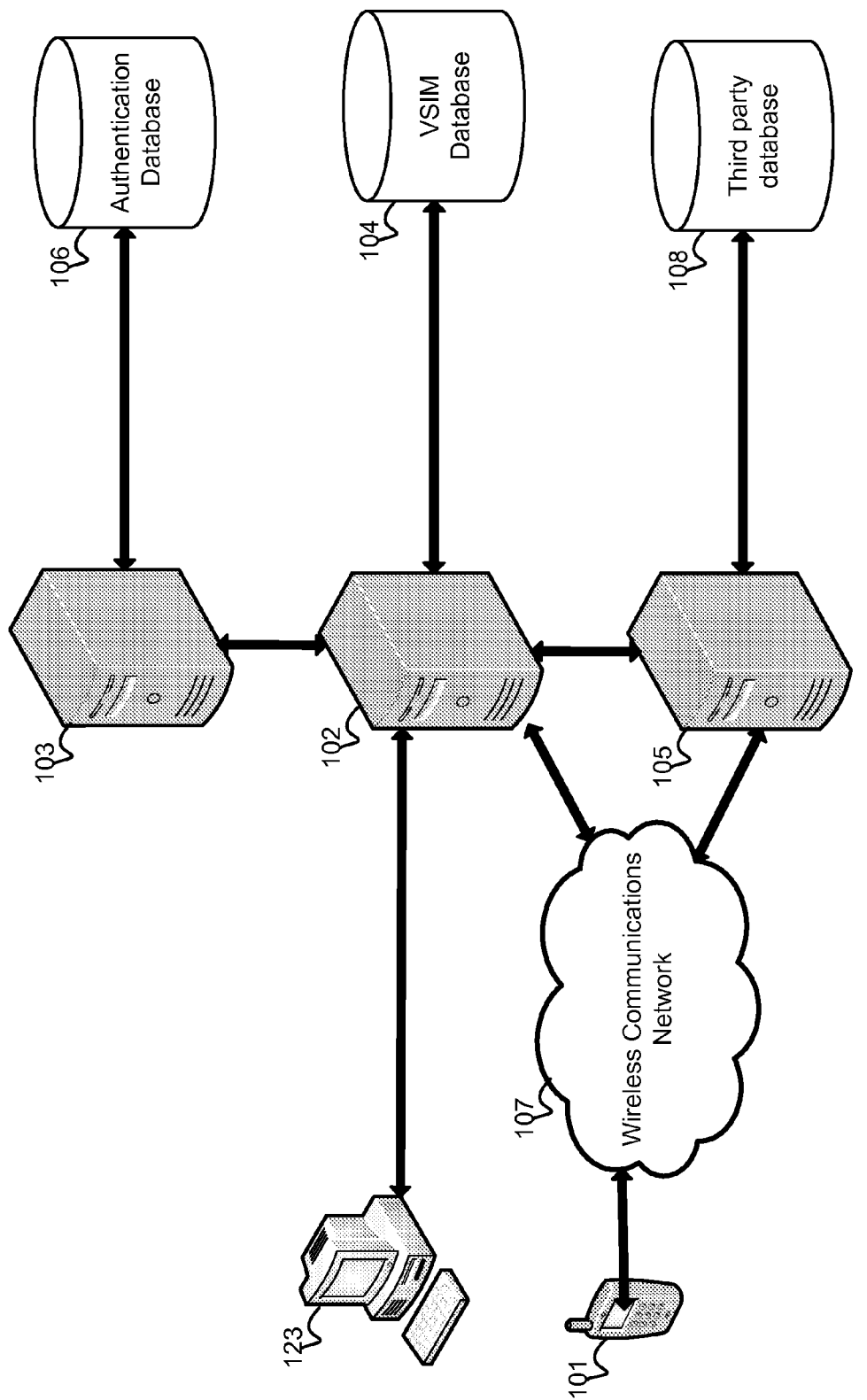
FIG. 1 is a system diagram illustrating an embodiment system which provides for virtual SIM (VSIM) capabilities.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the term mobile device may refer to any one or all of cellular telephones, personal data assistants (PDA's), palm-top computers, laptop computers, wireless electronic mail receivers (e.g., the Blackberry® and Treo® devices), multimedia Internet enabled cellular telephones (e.g., the iPhone®), and similar personal electronic devices which include a programmable processor and memory. In a preferred embodiment, the mobile device is a cellular handset that can communicate via a cellular telephone network (e.g., a cellphone).

As used herein, the term "server" refers to any of a variety of commercially available computer systems configured to operate in a client-server architecture. In particular, the term "server" refers to network servers, particularly Internet accessible servers, which typically include a processor, memory (e.g., hard disk memory), and network interface circuitry configured to connect the server processor to the network, such as the Internet or a cellular telephone network.

Today's mobile devices have evolved from simple cellular telephones into portable computing platforms capable of supporting a wide variety of applications and media formats. With increasing processing power, memory capacity, and communication network capacity modern mobile devices can support voice calls, video phone calls, data calls, and web browsing, all while enabling taking and displaying photos, playing audio and video files, sending and receiving multiple message formats including SMS and email, creating and editing spreadsheets and documents, conducting financial and banking transactions, downloading and playing games and executing other third party developed applications.

The functioning of mobile devices and installed applications are typically controlled by a variety of device and application settings as well as user preferences and settings. The device, application, and user preferences and settings may include, for example, device configuration settings, device-specific application settings, and user preferences such as ring tones used for different events or the wallpaper shown on the mobile device display. For example, an application can be configured to function on a particular mobile device by recording device-specific settings that inform the application of compatibility details, such as number of pixels in the display, the particular keyboard layout and total memory size. As another example, users often configure their mobile devices with a specific look and feel. User preferences and settings may also include, for example, a user's personal data used by various applications operating on the mobile device. For example, user preferences and settings may include the contact information used in a phonebook application or audio/video files used in an audio/video player application.

Device-specific application settings may be employed in applications to enable a given application software image to be implemented on a variety of different makes and models of mobile devices. Mobile devices typically differ in memory size, processor types, internal resources, display capabilities and dimensions, keyboard layouts, and communication capabilities. Such differences can be accommodated with a given application by configuring its functionality to match the capabilities and characteristics when the application is installed in a mobile device. For example, a game application written to be compatible with a variety of mobile devices may need to be configured to a particular device by entering its screen size and resolution information or the device model number. Additionally, the game application may include user settings (e.g., playing mode) that will be stored in memory.

Many mobile devices are capable of accessing the Internet via wireless data communications over traditional cellular communication networks to routers eventually linking with the Internet. Through this capability, users may now browse webpages hosted by servers connected to the Internet. For example, by accessing a financial institution's website, users can conduct various banking transactions through their mobile devices. Such use of the Internet requires entry of a proper URL of the desired website and, when accessing restricted sites like banking sites, presentation of a proper authentication credential. In many instances users may streamline this process by bookmarking the website's URL and storing the necessary authentication credentials in local memory from which they can be automatically retrieved. For example, authentication credentials, such as a private electronic certificate may be delivered to a mobile device and installed into the mobile device's secured memory when an account is first set up. The certificate may contain a private shared key between the mobile device and the back-end financial institution's server. The certificate is used to authenticate the user's particular mobile device, while the password is used to authenticate the user. The private electronic certificate may be stored in a secured local memory and automatically retrieved by the mobile device and transmitted to the financial institution's server whenever the webpage is accessed. Storing such settings in memory efficiently streamlines the tasks for the user, by automatically completing steps such as typing in the URL address of the webpage or completing the authentication process. In addition, the transfer of the private electronic certificate may be essential for the user to continue to execute financial transactions on the mobile device.

Another example of user settings are authentication credentials associated with on-line electronic commerce. Users may download audio and video files from various content providers (e.g., iTunes) or applications from third party provider servers where an account must first be setup by the user. Credit card or other forms of payment data may be pre-stored as settings data in the user's account to make checkout easier and more streamlined. Authentication credentials may be stored in local memory to prevent unauthorized access to a user's account from any device other than the user's mobile device. The authentication credentials may be as simple as storing the user's identification and password in memory or an electronic authentication credential which allows the content provider server to recognize the electronic signature of the mobile device itself from which access to the content provider's website is requested.

While the storage of such settings and/or authentication credential data may make various tasks easier for users, the storage of some of the settings and/or authentication data may be essential for some tasks. For example, by recognizing the mobile device itself and preventing the download of audio, video, or even application data to any mobile device that is not recognized, content and application providers may be able to implement forms of digital rights management (DRM). Content and application providers can insure that duplicate copies of the content or applications data is only provided to the single user is authorized to listen, view or use the data. Consequently, it is essential that the authentication certificate be stored in local memory of the mobile device for access to content and/or application data to be granted.

Still further a user may purchase various third party developed applications for execution on the mobile device. Typically, applications designed specifically for mobile devices are available for purchase on a third party's host server and are downloaded directly to the local memory of the user's mobile device. Because the local memory of a user's mobile device is more difficult to access for the typical user, most users are unable to transfer the purchased applications from one mobile device to another. In cases where access to the data stored in local memory is available, the access typically provides a restricted view of the local memory content. In many cases, users will simply download (and purchase) wholly new copies of applications for new mobile devices.

As another example, most mobile devices may operate as a platform to send and receive a user's email. The mobile device may "pull" a user's email by sending an email download or update request to the user's email exchange server. Alternatively, some mobile devices may have the user's emails "pushed" to the mobile device when they are received by the email exchange server. Outgoing emails may be sent to the user's email exchange server and ultimately to the intended recipient whenever the user executes a send function on the mobile device. By establishing a communication link with email exchange servers via the Internet which is accessed via a wireless data communication link, mobile devices may send and receive emails. In order to do so the mobile device must have the URL address of the user's incoming and outgoing email exchange servers. In addition, in some instances, an authentication credential must accompany a request to send or receive emails to and from the user's email exchange servers. Such URL addresses and authentication credentials may be stored in the mobile device's internal memory as part of the user's settings profile.

When a mobile device is replaced the settings data must be manually transferred to the new mobile device. In many instances it may require several steps to enter all of the application and user's preference settings in the new mobile device. Currently, there are no known methods to easily transport the user's preferences and settings from an old mobile device to a new mobile device. The process of setting up a mobile device to include device, application and user preferences settings is referred to herein as provisioning the mobile device. The provisioning process may also include loading all of the necessary data and software from a service provider required to support a voice and/or data call on a service provider's wireless communication network. The necessary data and software is often referred to as provisioning data. In the various embodiments disclosed herein, the term provisioning refers to not only the loading of the necessary data and software to support voice and/or data calls but may also refer to the activation of various application and user preference settings on a mobile device.

Currently, mobile device provisioning is accomplished either through manual input from the mobile device's user interface, or through a set of incoherent protocols. For example, the loading of the necessary provisioning data to support voice and/or data calls may be done through an over the air service provisioning (OTASP) or Internet-Over-the-Air Device Management (IOTA-DM). Transferring all of the user's contacts and appointments to the phonebook and calendar application may be done through SyncML-DS. Transferring user audio and video files to a music player/video player may be performed through Open Mobile Alliance Device Management (OMA-DM), Apple Fairplay® or Microsoft Genesis®. The transfer of previously loaded third party applications and software may be performed through a Java, BREW or similar platform/environment download.

In some instances, users may request a technician at a service provider's service center to transfer personal data stored in local memory of an old mobile device to the new mobile device. In most cases, technicians will be able to retrieve and transport general application data such as phonebooks/calendar and the like. However, other specific user setting data is often lost in the process. In some instances, the settings of a user's prior mobile device may be specific to the particular make/model of the prior mobile device and so technicians at the service center may not be able to restore or transfer these settings and/or preferences to the new mobile device properly. This may be because the location or method of storage of these user settings may vary from one mobile device make and model to another. The transfer of user settings data may require knowledge of the various storage systems implemented on each make and model of mobile device. Most users and even many technicians do not possess this knowledge. Consequently, users are forced to re-install all of the applications once installed on their prior mobile device to the new mobile device. In many cases, important application data and/or user settings and preferences are lost in the manual process. Moreover, in many instances a mobile device is replaced because the old device has been lost, stolen or destroyed. In such instances, the user will have no recourse other than to manually input new settings data into the new mobile device.

When a new mobile device is activated, the mobile device must be provisioned. Such provisioning loads into local memory all of the necessary settings and software required to enable the mobile device to properly initiate and maintain a connection with a service provider's communication network to support voice and/or data calls. Traditionally, provisioning data has been stored in a removable smart card such as a Subscriber Identity Module (SIM) card or analogous Removable User Identity Module (RUIM). In addition, some general user data such as phonebook/calendar data may also be stored in the smart card. Through the use of such smart cards, a user may quickly exchange a mobile device for another by simply inserting the smart card which contains all the provisioning data associated with the user's service contract account into the new mobile device. The user may then conduct a call on the new mobile device just as if the new mobile device were the old mobile device.

System and methods have been proposed for providing a virtual SIM (VSIM) which allows a user to remotely store provisioning data at a VSIM server (or VSIM database) in: U.S. patent application Ser. No. 11/963,918, entitled "Virtual SIM card for Mobile Handsets" filed on Dec. 24, 2007; U.S. patent application Ser. No. 12/020,028, entitled "Biometric Smart Card for Mobile Devices" filed on Jan. 25, 2008; U.S. patent application Ser. No. 12/480,319, entitled "Virtual SIM card for Mobile Handsets" filed on Jun. 8, 2009; U.S. patent application Ser. No. 12/480,406, entitled "Method and Apparatus for Switching Virtual SIM Service Contracts Based Upon a User Profile" filed on Jun. 8, 2009; U.S. patent application Ser. No. 12/480,453, entitled "Method and Apparatus for Updating the Rules Governing the Switching of a Virtual SIM Service Contracts" filed on Jun. 8, 2009; and U.S. patent application Ser. No. 12/480,490, entitled "Method and Apparatus for Switching Virtual SIM Service Contracts when Roaming" filed on Jun. 8, 2009. Each of the foregoing patent applications is hereby incorporated by reference in their entirety. Mobile devices implementing a VSIM capability store provisioning data (as well as application data) in local memory of the mobile device. A duplicate copy of the user's provisioning data may also be stored on a VSIM server or in a VSIM database. The VSIM capability allows a user to quickly and easily transport the provisioning data supporting a service provider contract from one mobile device to another. A user's VSIM provisioning data is stored in a data record associated with the user's account maintained on a VSIM server (or in a VSIM database). The provisioning data may be remotely accessed by any mobile device which contains a VSIM memory unit to locally store the provisioning data contained within the VSIM account. In this manner, a user can configure any VSIM-equipped mobile device with the user's provisioning data, thereby enabling the user to send and receive telephone and data calls via the user's cellular service provider accounts. The VSIM account may also include user personal data such as phone book application data, picture, audio and video files, and user preference settings for the mobile device. When a user exchanges VSIM-capable mobile devices, the user's VSIM account may be accessed and all of the data stored in the associated data record may be transported to the VSIM memory unit of the new mobile device. Downloading data stored in the VSIM account to the VSIM memory unit of the new mobile device configures the new device to operate, look and feel the same as the old mobile device.

While the VSIM capability provides a readily accessible back up for provisioning and personal data that simplifies switching mobile devices, there will still be the need to configure a new mobile device with application and user setting data. This is because the provisioning data that can be stored in a VSIM data record in local memory or in server memory does not include all settings. As noted above, configuring a mobile device with setting data may require a sequence of steps. Also, the settings appropriate for one model mobile device may not be suitable for a different model. In the case of third party applications (i.e., applications offered by parties other than the mobile device manufacturer or the cellular service provider), the settings appropriate for specific model mobile devices and the steps for configuring the applications may be known only to the application developer. Thus, there remains a need to simplify the process for configuring mobile devices with application and user settings as part of the VSIM provisioning process.

The various embodiments allow a user to seamlessly transport all of the provisioning data, personal data, as well as a user's preferences and settings from one mobile device to a new mobile device by creating a VSIM capability enabling portions of the mobile device's internal memory to store such data. The VSIM may be implemented on all mobile devices, including GSM, UMTS and CDMA varieties. A user may purchase a VSIM service contract from any service provider and download the corresponding provisioning data for that service provider. The provisioning data may be loaded into the VSIM memory unit of the mobile device. Moreover, a user may store the provisioning data for multiple service contracts within the VSIM memory unit. The user may manually select a particular service provider's provisioning data for activation or may set the mobile device to automatically select a service provider's provisioning data for activation.

When a user activates the VSIM memory unit on a new mobile device, the device may contact the VSIM server to retrieve the data stored within the user's VSIM account. This process causes the user's preference settings stored within the VSIM account to be downloaded to the VSIM memory unit in the mobile device. The downloaded VSIM data may then be used by the mobile device to implement the user's preferences and settings on the new mobile device. As part of the automatic generation and initiation of user preferences and settings, activation of the user's VSIM account may trigger a connection between the mobile device and one or more third party servers to download data to implement all of the user's preferences and settings on the new mobile device. This process may also include downloading of third party applications and data for execution on the mobile device.

FIG. 1 illustrates an overall architecture of an embodiment wherein a mobile device 101 communicates over a wireless communications network 107 with a VSIM server 102 to send and receive provisioning data, personal data, and settings data. The VSIM server 102 may be coupled to an authentication server 103, such as by way of a wired, fiber optic or wireless network connection. The VSIM server 102 may contain internal memory storage units such as a mass storage disc drive, or may be in connection with a VSIM database 104, which is configured to store the provisioning and personal data for each mobile handset operating on the system. Similarly, the authentication server 103 may contain internal memory storage units such as mass storage disc drives, or may be connected to an authentication database 106, which is configured to store the authentication credentials for each mobile handset operating on the system. In an embodiment, the VSIM server 102 may also act as the authentication server 103 by incorporating authentication functions within the VSIM server software and providing sufficient memory storage units 104.

Figure 2:
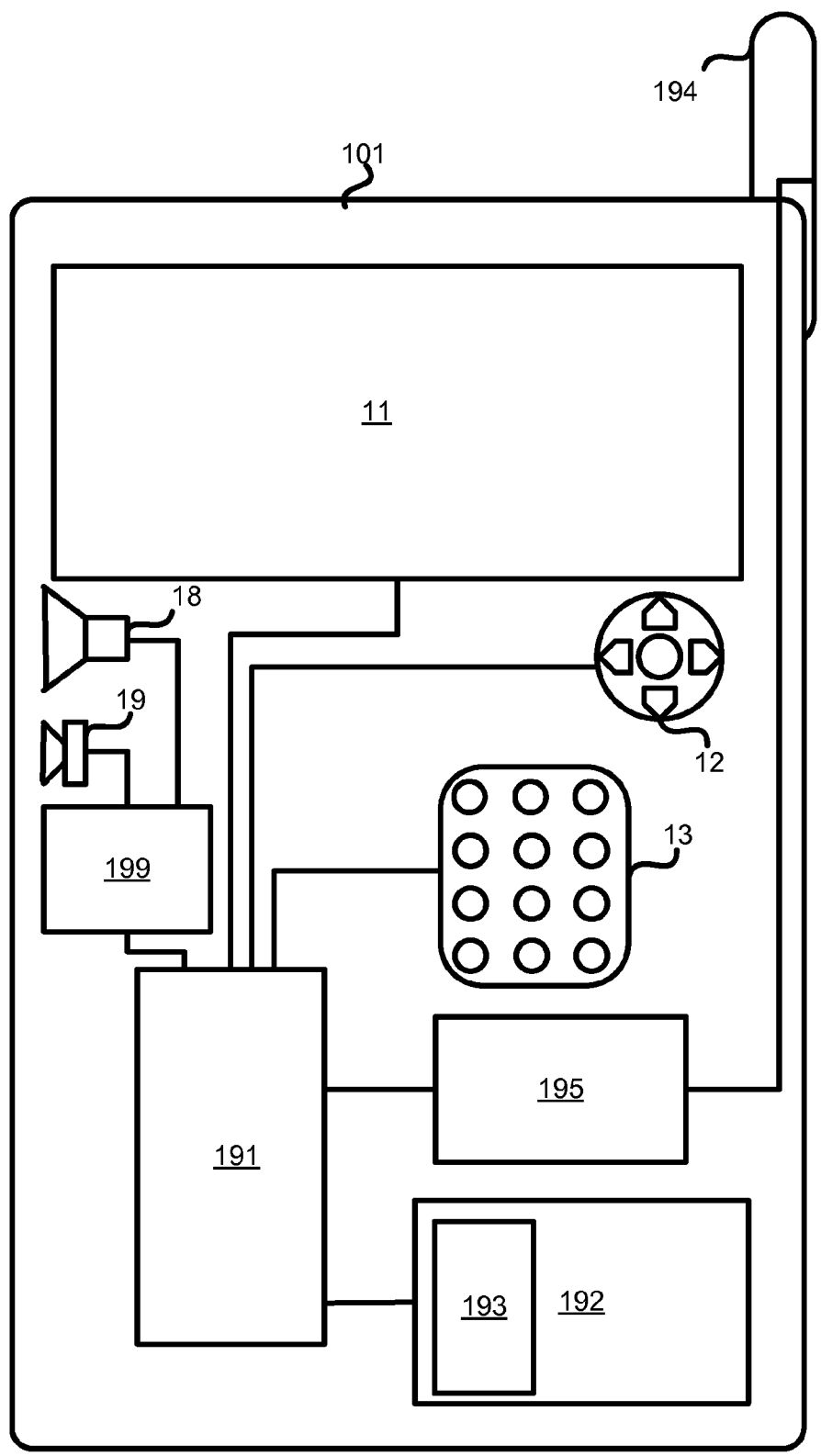
FIG. 2 is a system block diagram of a mobile device suitable for use in an embodiment.

FIG. 2 illustrates the components typically included within a mobile device 101 useable with the various embodiments. A mobile device 101 typically includes a processor 191 and an internal memory storage unit 192, such as a random access memory or flash memory unit. The internal memory 192 includes a VSIM memory unit 193 which is used to store the provisioning data, personal data as well as settings data contained within a VSIM account. The VSIM memory unit 193 may be a partition within the mobile device internal memory 192 or may be a separate internal memory unit (i.e., a separate memory chip). Since all of the data stored within the VSIM account may be sensitive and may be transmitted back and forth between the mobile device 101 and VSIM server 102, the VSIM server 102 and the mobile device processor 191 can be configured with software to encrypt such information using known data encryption and key methods to protect data from unauthorized viewing.

The mobile device 101 may include an antenna 194 for sending and receiving electromagnetic radiation that is connected to a wireless data link and/or cellular telephone transceiver 195 coupled to the processor 191. In some implementations, the transceiver 195 and portions of the processor 191 and memory 192 used for cellular telephone communications are referred to as the air interface since the combination provides a data interface via a wireless data link. Further, the mobile device 101 includes a speaker 18 to produce audible sound and a microphone 19 for sensing sound, such as receiving the speech of a user. Both the microphone 19 and speaker 18 may be connected to the processor 191 via a vocoder 199 which transforms analog electrical signals received from the microphone 19 into digital codes, and transform digital codes received from the processor 191 into analog electrical signals which the speaker 18 can transform into sound waves. In some implementations, the vocoder 199 may be included as part of the circuitry and programming of the processor 191.

The processor 191 may be any programmable microprocessor, microcomputer or multiple processor chip or chips that can be configured by software instructions (applications) to perform a variety of functions, including the functions of the various embodiments described below. In some mobile devices, multiple processors 191 may be provided, such as one processor dedicated to wireless communication functions and one processor dedicated to running other applications. Typically, software applications may be stored in the internal memory 192 before they are accessed and loaded into the processor 191. In some mobile devices, the processor 191 may include internal memory sufficient to store the application software instructions. For the purposes of this description, the term memory generally refers to all memory accessible by the processor 191, including the internal memory 192, the VSIM memory unit 193 and memory within the processor 191 itself. The internal memory 192 and the VSIM memory unit 193 may be volatile or nonvolatile memory, such as flash memory, or a mixture of both. In a preferred embodiment, the VSIM memory unit 193 is nonvolatile memory in order to retain the service contract provisioning data when the mobile device is turned off. Mobile devices also typically include a key pad 13 and menu selection buttons or rocker switches 12 for receiving user inputs.

The VSIM of the various embodiments described herein functionally takes the place of a SIM card in GSM handsets and stores the provisioning information in UMTS and CDMA handsets. In operation, a mobile device processor 191 recalls the selected service provider's provisioning data stored in the VSIM memory unit 193 (instead of in a SIM card) in order to support wireless voice and data communications. In addition, applications executed on the mobile device such as phonebooks, audio and video players, Internet browsers, etc., may access data stored within the VSIM memory unit 193 to support their execution. The data contained within the VSIM memory unit can be backed up and maintained on the external VSIM server 102.

The VSIM services provided by the VSIM server 102 may be offered to mobile device users as a standard feature of service or as an extra subscription fee service. This architecture allows the provisioning data, personal data, and settings data to be downloaded to the VSIM memory unit 193 at any time, providing flexibility in provisioning and programming new mobile devices. This architecture also provides users with an external backup of VSIM data. By logging onto the VSIM server 102 via a wireless communications network, users may backup their provisioning data, personal data, and settings data to the VSIM server 102. Then, even if the mobile device 101 is lost or destroyed, their provisioning data, personal data, and settings data is preserved, ready for downloading onto a replacement mobile device. To restore their provisioning data, personal data, and settings data, users log onto the VSIM server 102 via the cellular telephone network, authenticating themselves by transmitting authentication credentials for comparison against previously stored authentication credentials. Authenticated users are able to restore their provisioning data, personal data, and settings data to the replacement mobile device by having the information downloaded directly into the VSIM memory unit 193. Users who are not authenticated are denied access to the VSIM database.

In addition, the VSIM server 102 may be in communication with a multitude of third party servers 105. Each of the third party servers 105 may include or be in communication with a corresponding third party database 108. Each of the third party servers 105 and databases 108 may contain a variety of media data files or third party developed applications available for downloading to the mobile device 101. The VSIM server 102 may be in communication with the third party serves 105 via a communication network such as the Internet over hard wired landlines or via a wireless communication network 107. Similarly, each of the third party servers 105 may communicate with mobile device 101 via the Internet and a wireless communication network 107.

Figure 3:
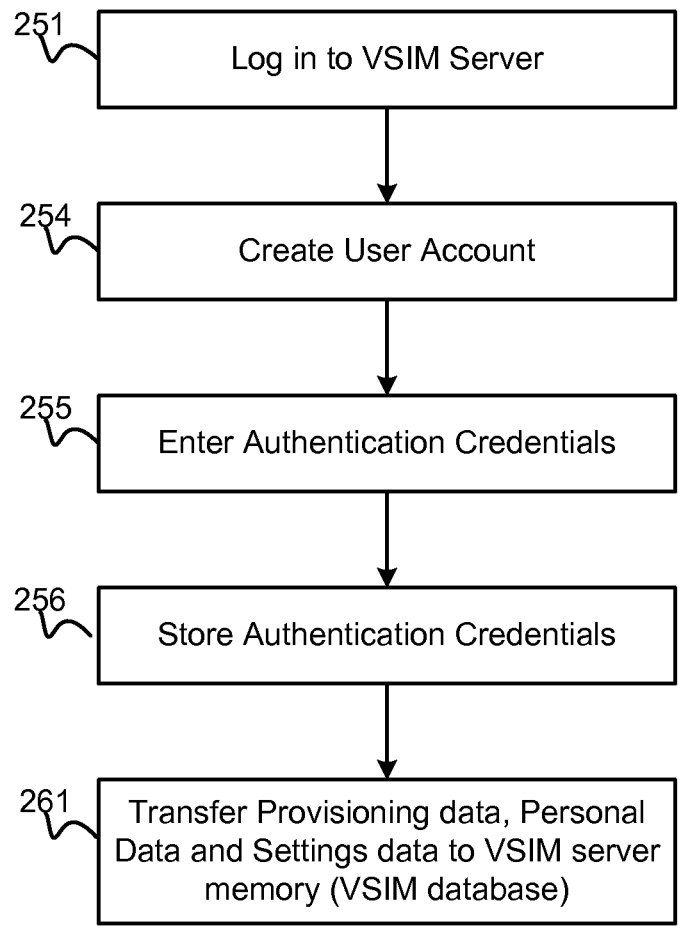
FIG. 3 is a process flow diagram illustrating the steps of an embodiment method for initializing a VSIM capability.

FIG. 3 illustrates in overview the process for creating a VSIM account on the VSIM server 102 and uploading personal data. VSIM service users first set up a VSIM account on the VSIM server 102, which may be operated by the network service provider or a third party VSIM service provider. To do so, users log in to the VSIM server 102, step 251. This may be accomplished by the mobile device 101 over a wireless communications network 107 or by using a computer 123 connected to the VSIM server 102 via the Internet over a PSDN connection. Data security measures, such as SSL or other secure link protocols, may be used to protect users' account and authentication information from being intercepted. Once logged onto the VSIM server 102, the user creates a user account, step 254. Such an account may be created by entering personal information into a webpage or into the handset itself. In the process, the user may create an account name (or user name) which may be an arbitrary but unique account name that will be associated with the specific mobile device 101 being registered. For example, the phone number of the mobile device 101 may be used as the account name. The user may also enter a password to be associated with the VSIM user account. The user's biographical information and user account name are stored as a data record or data file in the VSIM database 104.

As part of setting up the user account, the user may be prompted to enter authentication credentials, step 255. Since the VSIM server 102 is configured to be easily accessible to users and contains sensitive information, it is important that it be configured to authenticate users prior to transferring data. To enable this, the system may be provided with authentication information at the time the account is created that will be used in subsequent sessions to authenticate each user prior to granting access to the sensitive information. Any of a number of authentication methods may be employed, including password verification, biometric recognition, and combinations thereof. The authentication credentials are received by the VSIM server 102 (via the mobile device 101 over the wireless communication network 107 or through the user's computer 123 via a secured Internet link) and stored in the authentication database 106 via the authentication server 103 as an authentication file associated with the user account name, step 256.

In an embodiment, the authentication credential may be a simple alphanumeric password. In such an embodiment, the user will either be given a password or provided an opportunity to enter a password that will be stored in the authentication server 103 in conjunction with the user account name (or a key tied to the user account name stored in a different database). The user may also be prompted to enter a security question to be used in cases when the user forgets the password and needs to be issued a new one.

Figure 4:
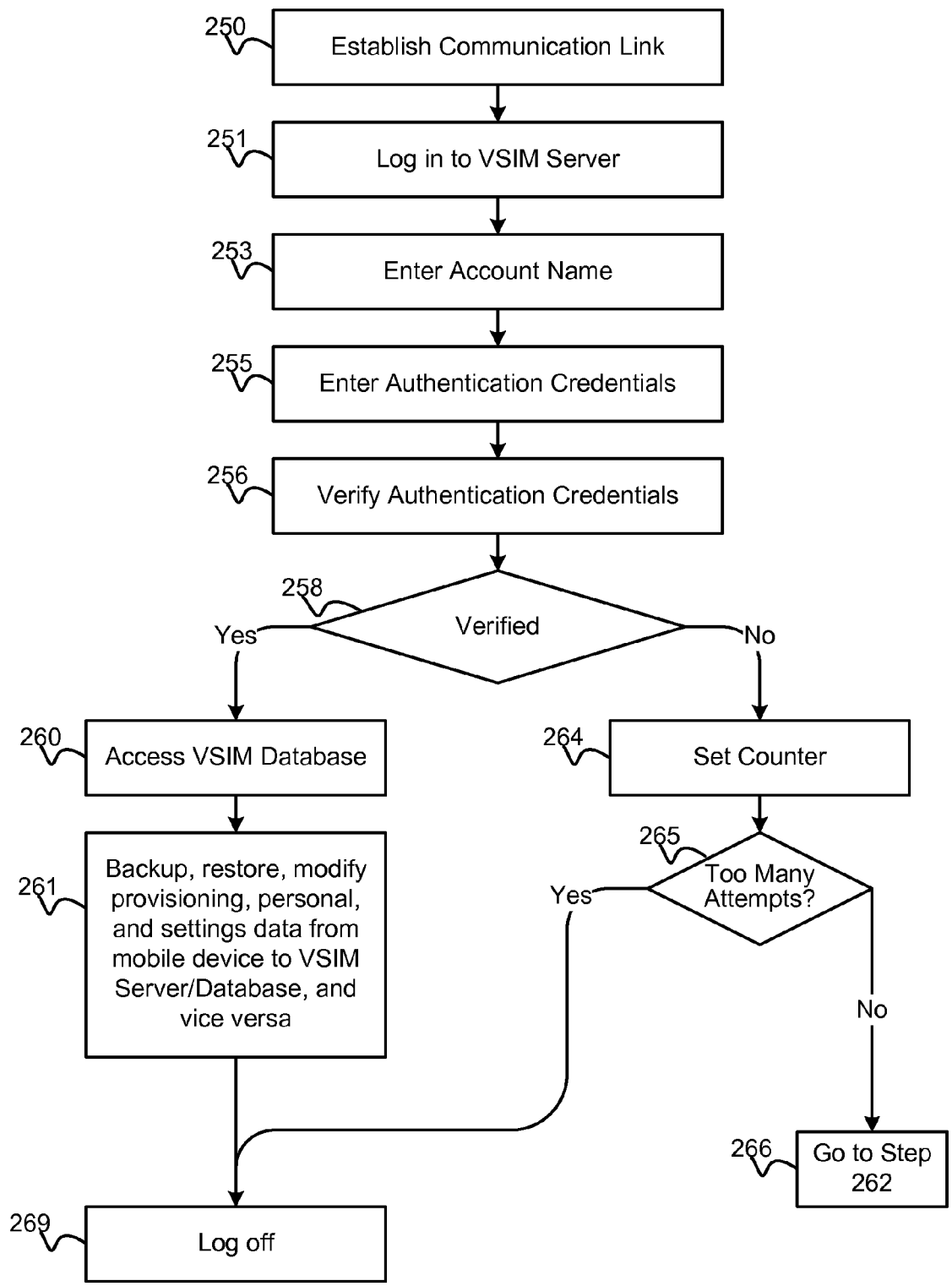
FIG. 4 is a process flow diagram illustrating the steps of an embodiment method for backing up/restoring/modifying personal data.

FIG. 4 illustrates an embodiment method for backing up, modifying and restoring provisioning data, personal data, and settings data using the VSIM capability after the user account has been initialized. Upon power up of the mobile device 101 or any other interval preset by the user or service provider, the mobile device 101 establishes a wireless communication link via a wireless communications network 107 to the VSIM server 102, step 250. Once the communication link has been established, log in to the VSIM server 102 is accomplished, step 251. As part of the login process, the user may enter the user's account information via the handset keyboard, step 253. The account name may be automatically received by the VSIM server 102, such as if the phone number associated with the mobile handset is used as the user account name. The user may enter authentication credentials, step 255. As above, the authentication credentials may be a simple alphanumeric password or some form of biometric data entered at the mobile handset 101. Once entered into the mobile device, the authentication credentials are preferably encrypted by the handset processor 107 and transmitted via the cellular telephone network to the VSIM server 102, which may pass the data to the authentication server 103.

The VSIM server 102 and/or authentication server 103 decrypts the received user account and authentication credential data, and accesses the stored authentication credentials associated with the user accounts (which were stored in the authentication server database 106 during the account setup procedure step 256). The received authentication credentials are compared to the stored authentication credentials to authenticate the user and verify that an authorized user is attempting to log in, step 256. If the authentication credentials match, test 258, the user is authenticated and access is granted to the user account files stored within the VSIM database 104, step 260.

Once access has been granted, the user may upload/backup provisioning data, personal data and/or settings data from the mobile device VSIM memory unit 193 to the VSIM database 104 via VSIM server 102, or restore provisioning data, personal data and/or settings data to the VSIM memory unit 193 from the VSIM server 102 (or VSIM database 104), step 261. During a backup procedure, provisioning data, personal data and/or settings data is transmitted from the VSIM memory unit 193 of the mobile device 101 to the VSIM database 104 via the VSIM server 102. Any updates to the user's settings or preferences that have been made since any prior backup procedure may be transmitted to the VSIM account at this time. As part of the backup procedure, the mobile device 101 may request the VSIM server 102 to add new triggers to the VSIM account corresponding to new application(s) or new classes of service installed on the mobile device 101.

For example, a private bank may use a proprietary application to enable users to access their banking accounts. A user may download and install the proprietary application on the mobile device 101 via the private bank's website. Once the proprietary application has been installed on the mobile device's memory, a request to install a trigger into the user's VSIM account may be created such that during the next backup procedure the appropriate trigger may be written into the user's VSIM account. The trigger may include instructions so that if the proprietary application is downloaded to a new mobile device 101 as the result of the execution of the trigger, the proprietary banking application will disable the account on the old mobile device and enable the account on the new mobile device. Alternatively, the trigger may include instructions so that if the proprietary application is downloaded to a new mobile device 101, the proprietary banking application will generate a new certificate and download it to the new mobile device 101. Thus, the old certificate existing in the old mobile device will be rendered useless. In both instances, the VSIM account may insure that the old mobile device will not be able to access the bank information. Such a feature may prevent fraud if the mobile device is later found, recycled or sold to a new user.

During the restore operation, personal data is transmitted from the VSIM database 104 to the mobile device 101 and stored in its VSIM memory unit 193. The user may also perform other operations, such as modifying provisioning data, personal data and/or settings data stored within the VSIM account stored in the VSIM database 104. A data modification procedure may be similar to the backup procedure. So long as access is granted to the user, provisioning data, personal data and/or settings data may flow from the mobile device 101 to the VSIM database 104 via the VSIM server 102 and vice versa. Once the user has completed the desired backup, restore, modify procedures, the user may log off the VSIM server, step 269.

If the authentication credentials do not match (i.e., test 258="No"), then access to the VSIM database 104 via the VSIM server 102 will be denied. As shown in FIG. 4, a flag may be set or a count established to record the number of unsuccessful authentication attempts, step 264. If the number of unsuccessful authentication attempts exceeds a preset number, the user may be logged off by the VSIM server 102, step 269. Otherwise, the user may be prompted to attempt to authenticate again, step 266. In alternative embodiments, the method may simply allow unlimited authentication attempts, in which case it would not be necessary to perform the initiate counter step 264 or determine if too many attempts had occurred as in step 265.

Figure 5:
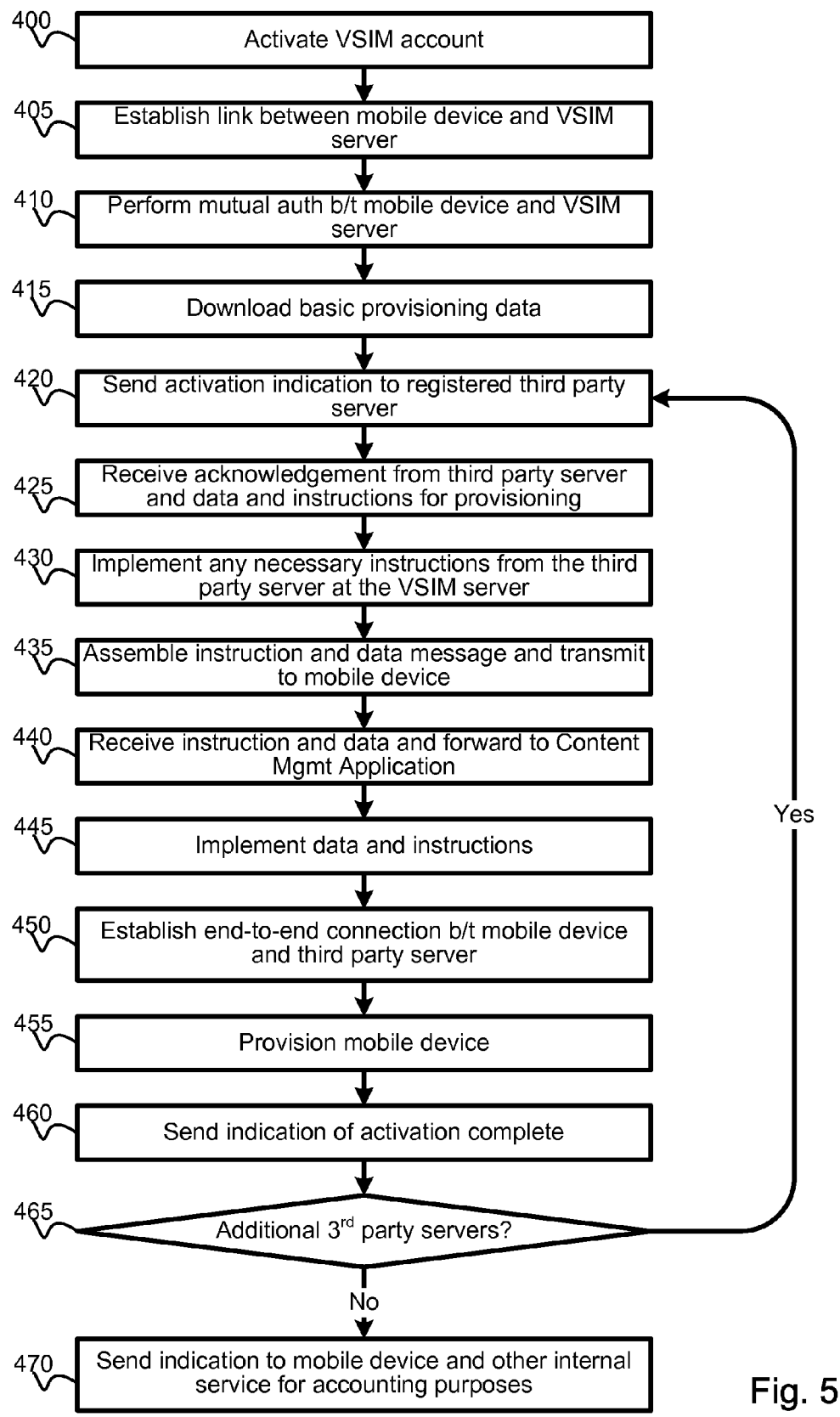
FIG. 5 is a process flow diagram illustrating the steps of an embodiment method for provisioning a mobile device in an embodiment system.

FIG. 5 is a process flow diagram illustrating the steps performed in embodiment systems to provision a mobile device with a user's provisioning data, personal data and settings data. A VSIM account may be activated by the user at the mobile device 101. For example, the user may initiate a command through the mobile device 101 to initiate the activation of the VSIM account. Alternatively, the VSIM account may be activated by the user at the VSIM server 102. In this second instance a request to provision the mobile device 101 may be made a device or computer coupled to the VSIM server 102, such as via the Internet without use of the mobile device 101 itself. For example, a technician may remotely provision a user's mobile device 101, such as by accessing the VSIM server 102 from a computer on a local network (e.g., a technician collocated with the VSIM server). As another example, a user may initiate provisioning of the mobile device 101 by transmitting a request to the VSIM server 102 via a computer 123 connected to the VSIM server 102 via the Internet over a PSDN connection. Thus, the command to initiate the activation of the VSIM account may similarly be generated at the VSIM server 102. This activation step 400 may occur the first time a user provisions the mobile device 101 or at a later time such as to update provisioning information.

After a user's VSIM account has been activated, a communication link between the mobile device 101 and a VSIM server 102 is established, step 405. In the first instance, the mobile device 101 will initiate establishing the communication link between the mobile device 101 and the VSIM server 102. In the second instance, the VSIM server 102 will initiate the establishment of the communication link between the mobile device 101 and the VSIM server 102. The communication link may be made via a wireless communication network or via a hard-wired link between the mobile device 101 and a computer 123 that connects to the VSIM server 102 via the Internet. In instances where the mobile device 101 is being provisioned for the first time, original equipment manufacturers (OEMs) may load sufficient provisioning data in local memory of the mobile device 101 to enable it to connect with a limited number of servers.

Once a successful communication link is established, a mutual authentication procedure may be implemented in which the user through the mobile device 101 is verified for proper access to the user's VSIM account and the VSIM server is authorized to the mobile device 101 as a legitimate source of provisioning information, step 410. Once both the mobile device 101 and VSIM server are properly authenticated, downloading of basic provisioning data (i.e., provisioning data, personal data and settings data that is self contained and stored in the VSIM account) may commence, step 415. The basic provisioning data contains all of the necessary programming software and data necessary to allow the mobile device 101 to support voice and data communications over a wireless communication network. In instances where the mobile device 101 has been previously provisioned, the basic provisioning data download step 415 may be used to update and restore any changes to the basic provisioning data stored in the local VSIM memory unit 193.

In an embodiment, various triggers to activate various multi-stage provisioning procedures may also be stored in the VSIM account. As the VSIM server downloads the VSIM account each of the triggers may indicate a need to perform some preference or settings restoration to the new mobile device. Such preference or settings restoration procedures may include the implementation of a setting specific to the new mobile device 101 to emulate one of the user's preferences or settings set in the prior mobile device. Implementation of each of these settings or preferences may differ slightly from mobile device to mobile device. Each manufacturer or model of mobile device 101 may require different procedures and instructions to effectuate the user's desired preference or settings. Accordingly, in an embodiment, information regarding the make and model of the new mobile device 101 may be transmitted from the mobile device 101 to the VSIM server 102. For example, such information may be transmitted to the VSIM server 102 during the authentication procedure or during the VSIM account data download/upload.

In addition, each trigger may indicate that a separate third party application download (via a JAVA or BREW download procedure) must occur to restore an application previously downloaded to the user's prior mobile device 101. In other words, each trigger may cause the VSIM server 102 to contact external third party servers 105 in order to download a previously purchased or downloaded application to the new mobile device 101 associated with the accessed VSIM account. In this manner, a user may setup a new mobile device 101 with the data files previously stored in the old mobile device and also setup the new mobile device 101 with each of the applications previously downloaded to the old mobile device. Such third party applications may include games, ring tones, wallpapers, audio, picture and video files, application software, etc.

Each trigger may represent a known third party vendor that has an established association or relationship with the VSIM server. For example, when a user creates and stores a VSIM account at the VSIM server 102, information regarding the various third party applications and content (e.g., ringtones, wallpaper, audio/video files, etc.) the user has downloaded and installed on the user's mobile device is also stored in the VSIM account. Each user's VSIM account will associate the particular user's VSIM account with the user's account with the third party server.

A trigger may contain the third party service name, third party server URL and user account identifier used to identify the user's account with the third party server. After the basic provisioning data is downloaded to the mobile device, step 415, VSIM server 102 may inspect the list of triggers associated with the user's VSIM account. The VSIM server 102 may contact each of the third party servers associated with the user's VSIM account by sending an activation indication to the third party server via the third party URL stored with each trigger and provide the appropriate third party user account identifier stored with each trigger to inform each respective third party server that VSIM account data is being transferred from one device to another device. Then each respective associated third party server can initiate a push instruction to the new mobile device 101.

Thus, upon completion of the basic provisioning data download, the VSIM server 102 may send an activation indication to a third party server 105 to initiate the multi-stage provisioning, step 420. The third party server 105 may be identified to the VSIM server 102 in the information stored within the user's VSIM account data record. Third party servers 105 can provide installation instructions and provisioning and setting data for a third party application loaded on the mobile device. Information regarding the third party server address may be included in the user's VSIM account data record when the user registers each third party application installed on the mobile device 101. During the registration process, user and application identification information (such as an application serial number) as well as the URL to the third party server 105 may be stored in application provisioning data stored in the VSIM memory unit on the mobile device. When the mobile device VSIM information is uploaded to the VSIM server for storage in the user's VSIM account data record, this information regarding the third party server 105 is available for use in the provisioning process. When the VSIM account is later activated or otherwise used to provision a new mobile device, the VSIM server can determine that third party provisioning is required for the installed applications and obtain the necessary URL for the correct third party servers 105. Using this information, the VSIM server can send an activation indication to each of the registered third party server 105 informing them of the mobile device being activated and information regarding the third party application to be installed and/or provisioned, step 420.

In response to the activation indication, the third party server 105 sends back an acknowledgement to the VSIM server 102, step 425. In addition or as part of this message, the third party server 105 may send instructions for both the VSIM server 102 and the mobile device 101 to configure and install the third party application on the mobile device 101. These instructions may contain an appropriate XML or similar executable code that enables the new mobile device 101 to download and install the application on the mobile device, including implementing the necessary settings to enable the application to execute on the device. In some cases, the instructions may enable the mobile device to download an application and/or data (e.g., authentication tokens) from the third party server 105. In some cases the installation instructions may be specific to the manufacturer and/or model of mobile device downloading the data and/or application. Information regarding the manufacturer and/or model of mobile device being activated may be included in the activation indication message (step 420). Alternatively, the make and model of the mobile device being activated may be transmitted during the subsequent end-to-end connection established between the mobile device and third party server 105, step 450 discussed in more detail below. Once the acknowledgement and instructions are received by the VSIM server 102, step 425, the VSIM server implements any necessary instructions received from the third party server 105 intended to be implemented by the VSIM server 102, step 430. The VSIM server 102 also assembles the instructions and data message received from the third party server 105 for transmission to the mobile device 101 via the established communication link between the VSIM server 102 and mobile device 101, step 435. In an embodiment, the instructions necessary to install or configure an application are pushed to a VSIM client operating on the mobile device along with authentication tokens.

The mobile device 101 receives the instruction and data message from the VSIM server 102 and forwards the instructions to an appropriate content management application, step 440. The content management application implements the instructions and uses the application data, step 445. The content management application may direct the mobile device 101 to establish an end-to-end communication connection with the third party server 105 in accordance with the implemented instructions, step 450. Once the end-to-end connection is established, the third party server 105 may communicate further data and instructions to enable completion of the provisioning of the mobile device 101, step 455. At this point the third party server may download a third party application to the mobile device. Alternatively, the provisioning of the mobile device 101 may include the downloading of data, such as authentication tokens, for use by an application 307 operating on the mobile device 101. The content management application may implement the received instructions. These instructions may launch a specific application using the data or alter settings in the mobile device 101 so that the downloaded data may be more effectively used by the application. For example, the content management application may launch an application (e.g., a GPS application) to alter a user setting. If, for example, the application were a GPS application, the content management application may receive the instruction message and launch the GPS application so that a user's "home" location may be set in the GPS location.

Alternatively, the provisioning of the mobile device 101 may alter or vary preference settings on the mobile device 101 in accordance with a user's prior preference settings. For example, if the application is an email application, the content management application may input the user's preference in how email is retrieved and displayed without the need to actually launch the email application.

As another example, the multi-stage provisioning data stored in a VSIM account at the VSIM server 102 may trigger a third party server 105 operating as a content management server to download a ringtone and/or wallpaper that may have been previously purchased and installed on the user's prior mobile device. The third party server 105 can then instruct the mobile device 101 to configure the ringtone and wallpaper setting in the same manner as was created in the user's prior mobile device.

Once the provisioning of the mobile device 101 by the third party server 105 is complete, the third party server 105 sends an indication to the VSIM server 102 that the provisioning is complete, step 460. Depending on each user's VSIM account data, additional third party server 105 may be sent an activation indication (step 420). If there are additional third party applications on the mobile device (i.e., decision 465="Yes"), the third party server associated with the next application to be install may be sent an activation indication, repeating the process steps 420-460 with the next third party server 105. If there are no further third party applications to be installed or configured (i.e., decision 465="No"), then an indication may be sent from the VSIM server 102 to the mobile device 101 content management application and other internal services for accounting purposes, step 470. The indication sent from the VSIM server 102 may provide a summary of the multi-stage VSIM provisioning process performed by the third party server 105 and the mobile device 101. The process of multi-stage VSIM provisioning may become fairly long depending on the number of third party servers 105 that receive an activation indication in step 420 and the amount of data that may be downloaded in each of these processes. At the end of each multi-stage provisioning process performed by each of the respective third party servers 105, the VSIM server 102 may need to reconcile all of the installation that has occurred and record an indication that the multi-stage provisioning process with a particular third party server 105 is complete. If the multi-stage provisioning process being performed by a third party server 105 is terminated or interrupted in the middle of the multi-stage provisioning process, the VSIM server 102 may need to re-establish the link to the new mobile device 101 in order to properly complete the process. Once the entire multi-stage provisioning process is complete, the VSIM server 102 may need to ensure that the old mobile device 101 is successfully deactivated from the VSIM server 102 and all respective third party servers 105. By doing so, the VSIM server 102 may ensure that only the most current user mobile device 101 is granted access to the data stored in the VSIM server 102 as well as in any third party server 105 associated with a user's VSIM account.

The VSIM server 102 may also need to provide an indication to each of the third party servers associated with the VSIM account that the complete download of data stored in the VSIM account has been successfully accomplished. If the VSIM account data download process is terminated or interrupted in the middle, the VSIM server 102 may need to indicate to the mobile device 101 and all associated third party servers that the new mobile device 101 is only partially activated.

Figure 6:
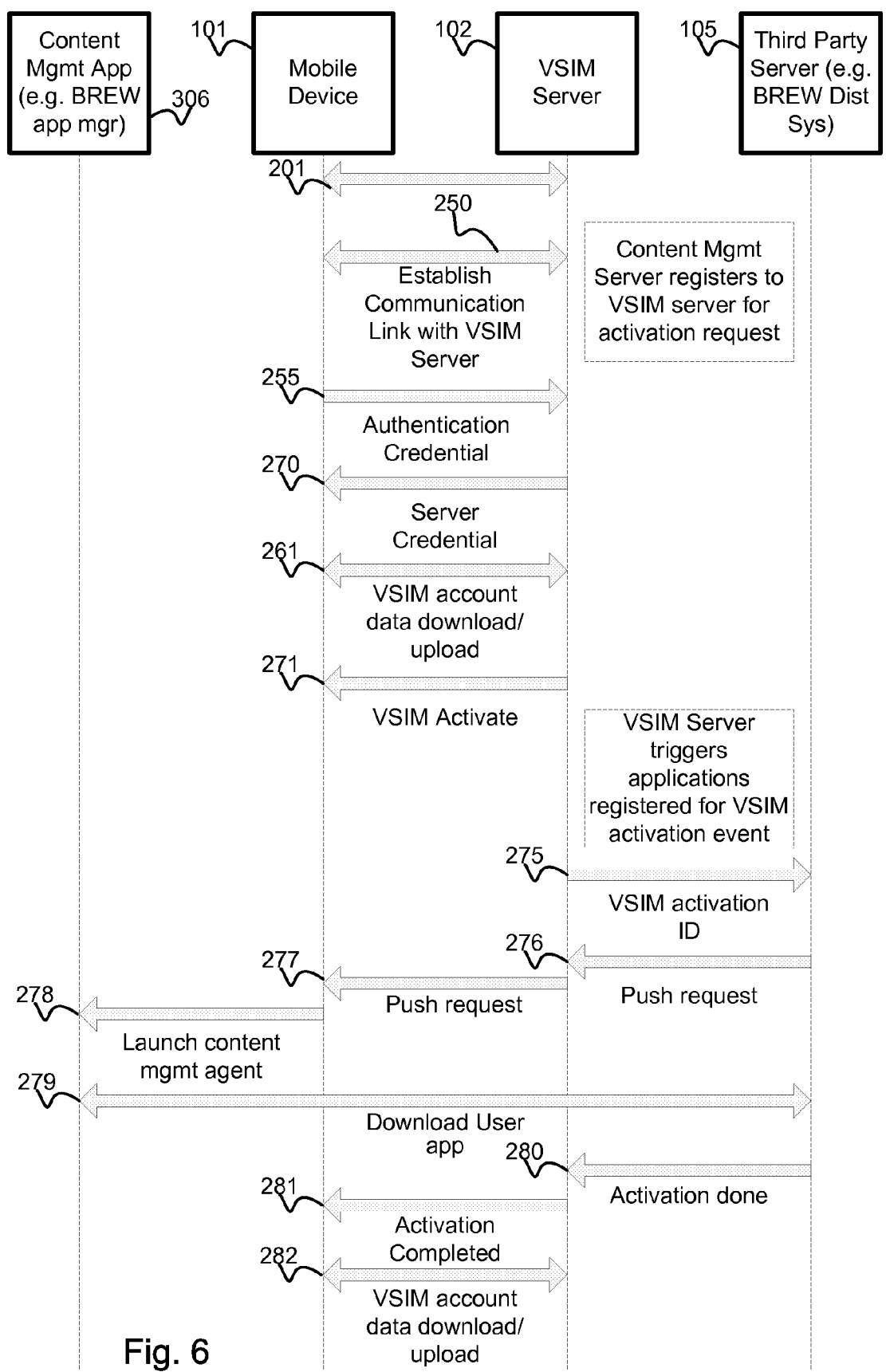
FIG. 6 is a message flow diagram illustrating the various transmissions made between elements in an embodiment system and method.

FIG. 6 is a message flow diagram of an embodiment method to configure a new mobile device using data stored in the VSIM account and instructions received from third party application servers. When a user wishes to configure a new mobile device 101 including installing his provisioning data, personal data, and/or settings, the user may initiate the VSIM restore function from the mobile device 101 (VSIM client), message 201. Alternatively, as discussed above with respect to FIG. 5, the initiation of the VSIM restore function may be made from the VSIM server 102 to the mobile device 101, message 201. A communication link between the mobile device 101 and a VSIM server 102 is established, messages 250. Since the initial VSIM restore function may be used to load a user's provisioning data to the mobile device 101, OEMs may provide new mobile devices 101 with enough provisioning data to support limited wireless data calls to a limited number of servers. Included among these limited number of servers may be a VSIM server 102 supporting the new mobile device 101. When the VSIM server 102 receives the initial message 201 from a mobile device 101, the VSIM server 102 may also authenticate the various third party servers 105 indicated by the user's VSIM account as containing content and/or application data that is part of a user's settings and preference data. The authentication process may include initiating secured links with the various third party servers 105. In some embodiments a persistent connection may be set up between the VSIM server 102 and all third party servers 105 indicated by each VSIM account stored on the VSIM server 102. In such an embodiment, the persistent secured connections to various third party servers 105 may be utilized by the plurality of VSIM accounts stored on the VSIM server 102. In another embodiment, the secured link may be established when a VSIM account is activated and the data stored in the VSIM account indicates that connection to the various third party servers 105 will be needed to complete the multi-stage provisioning.

Once the mobile device 101 and VSIM server 102 establish a communication link, the mobile device 101 may transmit a user authentication credential to the VSIM server 102 in order to gain access to the user's VSIM account and the data stored therein, message 255. See e.g., steps 254-260 and 264-266 of FIG. 4. Various authentication apparatus and methods for usage in a VSIM system are disclosed in U.S. patent application Ser. No. 12/020,028, entitled "Biometric Smart Card for Mobile Devices" previously incorporated by reference. Once the VSIM server confirms the user's authentication credentials, a server credential may be transmitted back to the mobile device 101 from the VSIM server 102 to verify the VSIM server and the subsequent data that will be transmitted to the mobile device, message 270. The server credential may take the form of a public certificate. The mobile device 101 can authenticate a VSIM server 102 that establishes a communication link with the mobile device 101 by confirming that the credential is signed by a certificate authority. This ensures that the mobile device 101 can be spoofed by a rogue server attempting to download improper provisioning data to the mobile device 101. Once the mobile device 101 has been authenticated to the VSIM server 102 and vice versa, the downloading of provisioning data, personal data and setting data may commence, messages 261.

In addition, any new updates to the provisioning data, personal data and settings data stored in local memory on the mobile device 101 may be uploaded for remote backup and saving in the VSIM account stored on the VSIM server 102/

VSIM database 104, messages 261. For example, the mobile device 101 may activate the VSIM at any time, not just the first time a user attempts to use a new phone. The user may wish to routinely backup and store the latest changes to the user's provisioning data, personal data or settings data to the VSIM server 102/database 104. In such an event, data will be uploaded to the VSIM server 102/database 104.

With the provisioning data and other data downloaded to the mobile device, the VSIM server may transmit a VSIM activation message 271 informing the mobile device that basic activation has been completed. At this point the mobile device may implement the provisioning data, such as installing the downloaded data into the VSIM memory unit, configuring the air interface or otherwise preparing to conduct voice and data calls using the activated service provider.

If a trigger exists in a user's VSIM account, the VSIM server 102 may transmit a VSIM activation indication (ID) to the appropriate third party server 105, message 275. The URL of the appropriate third party server 105 may be included within the VSIM account as a separate data entry or may be incorporated with the trigger. Alternatively, the URL may be stored in a look up table which correlates third party applications to the URL for the appropriate third party server 105. The VSIM activation indication message 275 to the appropriate third party server 105 may also include any necessary authentication credentials needed to verify the new mobile device 101 as belonging to the authorized user and previous purchaser/downloader of the application. In addition, in embodiments where the make or model of mobile device may alter the downloading procedure, such information may also accompany the activation indication message 275. Each third party server 105 contacted by the VSIM server 102 may transmit an acknowledgement back to the VSIM server 102 and provide direction to the VSIM server 102 and mobile device 101 to proceed with the further setup to download the requested application to the new mobile device 101, message 276. Such instructions may be specific to the make and model of mobile device based upon the information received in the activation indication message 275. The third party server 105 may generate an appropriate XML or similar executable code that enables the new mobile device 101 to proceed with the download of data and/or applications from the third party server 105. The installation instructions are in turn pushed from the VSIM server 102 to the mobile device 101, message 277. The acknowledgement push may contain the necessary authentication tokens and setup executable instructions to enable a successful installation and/or download of the application from the third party server 105. After the acknowledgement push is received by the mobile device 101, the setup instructions and authentication token are forwarded to the corresponding content management application associated with the media data or application, internal message 278. For example, the acknowledgement push may launch an MP3 player application (e.g., iTunes®) on the mobile device 101 in order to receive and store an audio file from a third party server 105 into the local memory of the mobile device 101. The content management application follows the setup instructions and may establish an end-to-end connection between the mobile device 101 and the third party server 105 or database 108, messages 279. In an embodiment, this end-to-end connection will be established over a wireless communication network 107. In another embodiment, the end-to-end connection may be established through a laptop or desktop computer which is tethered to the mobile device 101. The laptop or desktop computer may be hardwired to a communication network to access the Internet and ultimately to the third party server 105/database 108. Once the end-to-end connection is established the user's third party data file (data or application) may be downloaded to the mobile device 101 from the third party server 105/database 108, messages 279. In some embodiments, information identifying the specific manufacturer and model of mobile device that is being provisioned may be transmitted to the third party server through the end-to-end connection. In this manner, the setup instructions transmitted to the mobile device 101 may be tailored to the specific model device being provisioned.

Once the download is completed, the third party server 105 reports the successfully completion to the VSIM server 102, message 280. The indication of a successfully completed download may also be forwarded from the VSIM server 102 to the mobile device 101, message 281. Once the download is completed, the VSIM server 102 and mobile device 101 may continue to contact other third party servers 105 containing data and/or applications in accordance with triggers stored in the user's VSIM account. In cases where the mobile device 101 is sophisticated enough to support multiple push messages 277, concurrent multi-stage provisioning processes may be executed with multiple third party servers 105. In each instance, however, an indication may be sent from the third party servers 105 when each download is complete to alert both the mobile device 101 and VSIM server 102 regarding progress of the multi-stage provisioning process. Once the final download is complete the VSIM server 102 may optionally transmit a message to the mobile device 101 indicating completion of the setup procedures stored in the VSIM account, as well as to other internal services, optional messages 282. The download complete message may summarize the various multi-stage provisioning processes that have been completed for accounting purposes. Such messages allow the mobile device 101 and VSIM server 102 to resume multi-stage provisioning processes if the connection between mobile device 101 and VSIM server 102 or various third party servers 105 is interrupted or terminated before the multi-stage provisioning process is complete. Once all downloads are complete the connection between the mobile device 101 and VSIM server may be terminated.

Figure 7:
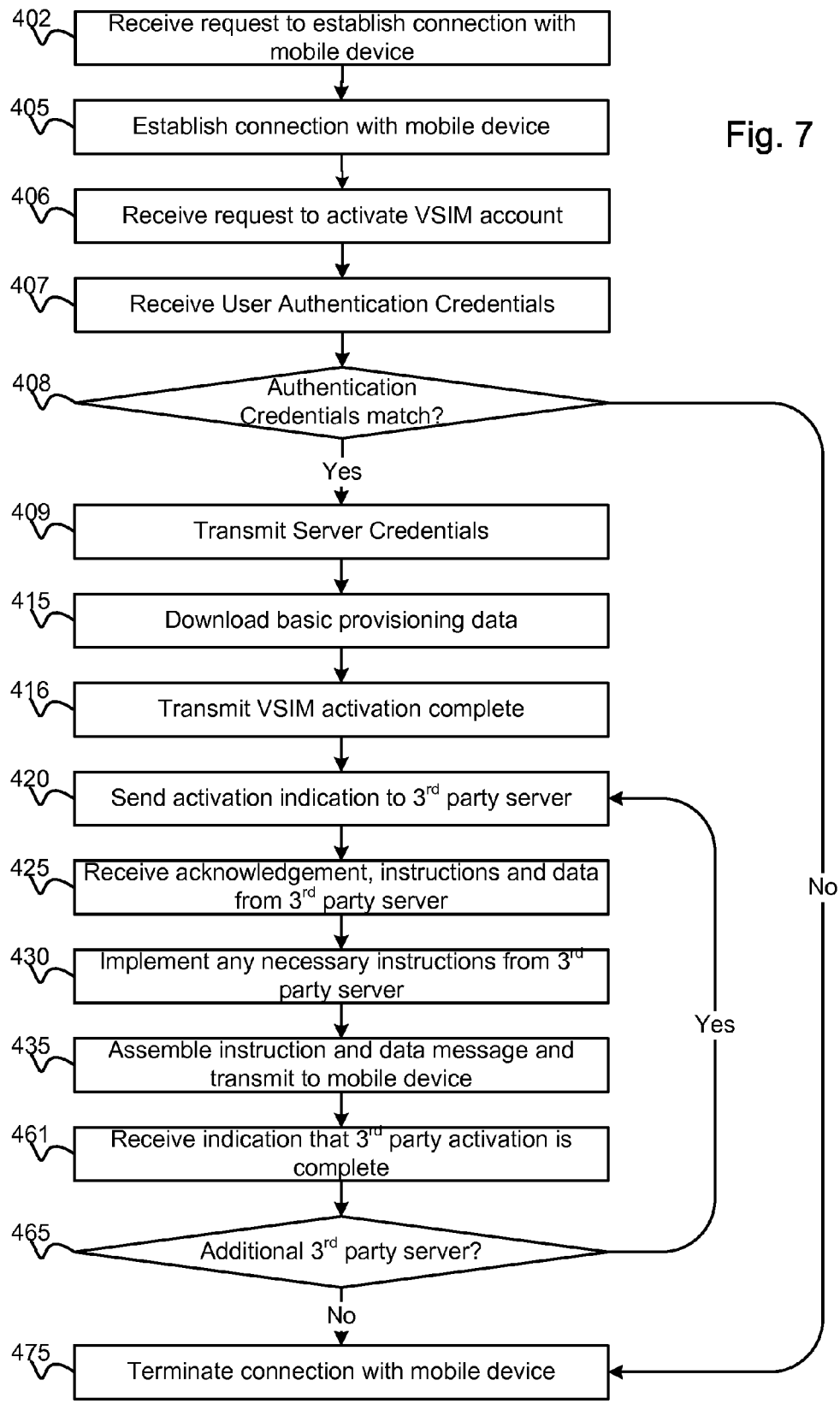
FIG. 7 is a process flow diagram illustrating the steps of an embodiment method for provisioning a mobile device performed by a VSIM server in an embodiment system.

FIG. 7 is process flow diagram of steps implemented by a VSIM server in the embodiment method shown in FIG. 5. A VSIM server 102 receives a request from a mobile device 101 to establish a communication connection, step 402. The VSIM server 102 responds to the request to establish a communication connection between the mobile device 101 and VSIM server 102, step 405. Through the established communication connection the VSIM server 102 may receive a request from the mobile device 101 to activate a user's particular VSIM account. The VSIM account may be stored in memory of the VSIM server 102 or a corresponding VSIM database 104. The VSIM server 102 may retrieve data from the user's particular VSIM account data record and place the data in a buffer or cache until the user initiating the VSIM account activation request is authenticated as an authorized user. The VSIM server 102 receives the user's authentication credentials, step 407, and compares the authentication credentials with those stored in an authentication server 103 and/or corresponding authentication database 106, decision 408. If the received authentication credentials match those previously stored in the authentication server 103/database 106 (i.e., decision 408="Yes"), then the user is deemed authorized to review, download and upload data to the VSIM account. In that case, the VSIM server 102 may transmit server credentials back to the mobile device 101 in order to authenticate the VSIM server 102 as an authorized source of provisioning data to the mobile device 101, step 409. The mobile device 101 may elect to terminate the communication connection with the VSIM server if the server credentials are not recognized by the mobile device 101 (not shown). If the received authentication credentials do not match the authentication credentials previously stored in the authentication server 103/database 106 (i.e., decision 408="No"), the VSIM server 102 may terminate the communication connection with the mobile device 101, step 475. Alternative steps may be implemented in the event the received authentication credentials do not match the authentication credentials previously stored in the authentication server 103/database 106 (i.e., decision 408="No"). For example, a counter may be utilized to allow the user to re-send authentication credentials, see e.g., steps 264-266 in FIG. 4. Alternatively, the user may be prompted on the display 11 with an option to purchase a new VSIM service account.

Once the mobile device 101 has been authenticated to the VSIM server, and vice versa, the basic provisioning data stored in the VSIM account data record may be downloaded from the VSIM server 102/database 104 to the mobile device 101, step 415. In addition, basic provisioning data stored in the local memory of the mobile device 101 may be uploaded to update the basic provisioning data stored in the VSIM account (step not shown). When the basic provisioning data has been completed, the VSIM server 102 may transmit a VSIM activation complete message to the mobile device 101, step 416. The VSIM server 102 may also send an activation indication message to each third party server 105 that has been registered to the VSIM server 102 based on various triggers stored in the VSIM account, step 420. In response to the activation indication message, the VSIM server 102 may receive an acknowledgment from the third party server 105, step 425. The acknowledgement message may also contain instructions and data from the third party server 105 that may be used to provision settings or an application and data (e.g., authentication tokens) to the mobile device 101 and VSIM account stored in the VSIM server 102/database 104. Upon receipt of the acknowledgement, instructions and/or data from the third party server 105, the VSIM server may implement any necessary instructions intended for implementation by the VSIM server 102, step 430. The VSIM server 102 may assemble any instructions and data intended for the mobile device 101 in a message that is transmitted or pushed to the mobile device 101, step 435. The instructions may contain the appropriate XML or similar executable code that enables the new mobile device 101 to proceed with the download of data and/or applications from the third party server 105. Based upon the instructions the mobile device 101 may perform a separate download with the third party server 105 (see step 455 in FIG. 8). When the provisioning download between the mobile device 101 and third party server 105 is completed, the VSIM server may receive an indication from the third party server that the provisioning between the mobile device 101 and third party server 105 is complete, step 461.

The VSIM server 102 may then review the VSIM account to determine if additional activation indications should be sent to other third party servers 105 for further provisioning, decision 465. If another third party server 105 should receive an activation indication (i.e., decision 465="Yes"), the VSIM server 102 may repeat steps 420-461. If no further third party servers 105 should receive an activation indication (i.e., decision 465="No"), the VSIM server 102 may terminate the communication connection with the mobile device 101, step 475.

Figure 8:
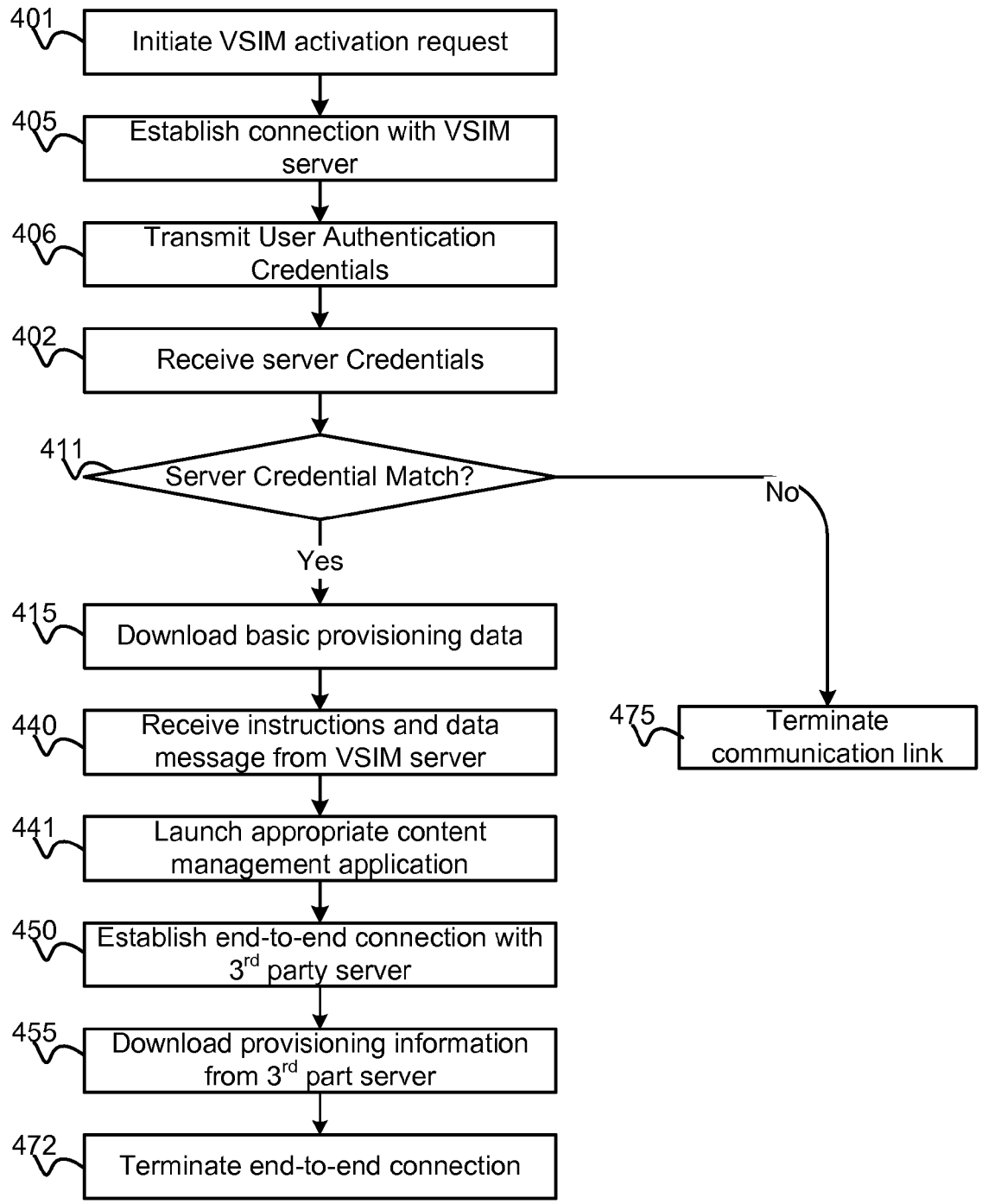
FIG. 8 is a process flow diagram illustrating the steps of an embodiment method for provisioning a mobile device performed by a mobile device in an embodiment system.

FIG. 8 is a process flow diagram illustrating steps that may be taken by a mobile device 101 in an embodiment method. Upon receiving a user request to initiate a VSIM account, the mobile device 101 may transmit a VSIM activation request to a VSIM server 102, step 401. The mobile device 101 and VSIM server 102 may exchange messages to establish a communication connection between each other, step 405. The mobile device 101 may obtain authentication credentials from the user and transmit them to the VSIM server 102, step 406. As mentioned above, various authentication credentials may be utilized. For example, a password may be received via user presses of keypad keys. Alternatively, mobile devices outfitted with biometric sensors may obtain biometric data from the user that can be used as an authentication credential. After sending authentication credentials, the mobile device 101 may receive authentication credentials from the VSIM server 102 in order to confirm that the VSIM server 102 is an authorized source of provisioning data, step 402. The server authentication credentials may be compared with server authentication credentials previously stored in local memory to authenticate the VSIM server, decision 411.

If the VSIM server authentication credentials match the server credentials previously stored in local memory (i.e., decision="Yes"), the mobile device 101 may begin downloading basic provisioning data from the VSIM server 102, step 415. If the VSIM server authentication credentials do not match the server credentials previously stored in local memory (i.e., decision="No"), the mobile device 101 may terminate the communication connection with the VSIM server 102, step 475.

After downloading of basic provisioning data is complete, the mobile device 101 may receive an instruction and data message that has been pushed from a third party server 105 via the VSIM server 102, step 440. The instruction and data message may contain XML or similar executable code that enables the mobile device 101 to download data and/or applications from the third party server 105. If prompted by the received instructions, the mobile device 101 may launch an appropriate content management application to install application settings and/or download an application or application data (e.g., authentication tokens), step 441. The mobile device 101 may establish an end-to-end connection with the third party server 105, step 450. With the end-to-end connection established, the mobile device 101 download further provisioning data or an application from the third party server 105, step 455. Upon completion of the downloading procedure in step 455, the mobile device 101 may terminate the end-to-end connection with the third party server 105, step 472.

Figure 9:
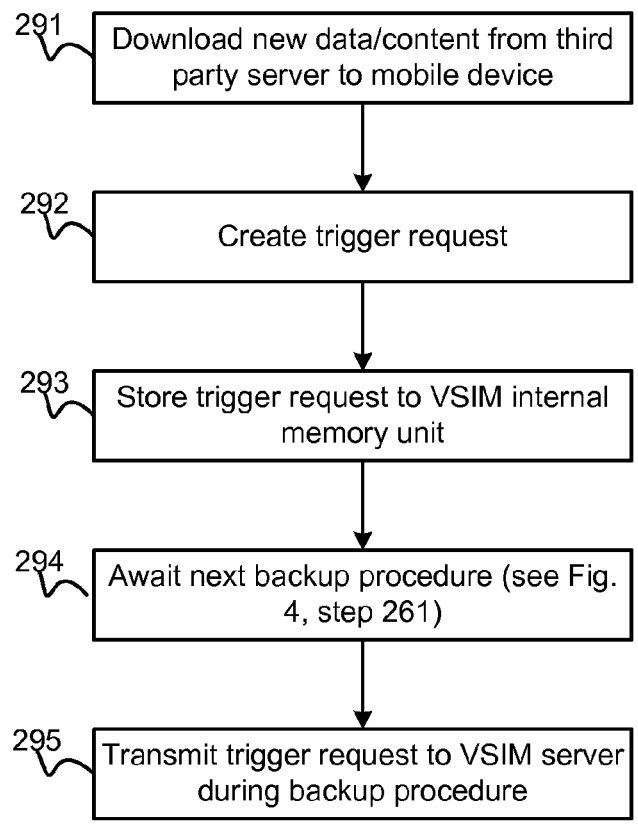
FIG. 9 is a process flow diagram illustrating steps that may be taken by a mobile device to generate a new trigger in the VSIM account.

FIG. 9 is a process flow diagram illustrating steps that may be taken by a mobile device 101 to generate a new trigger in the VSIM account. Over time a user may make modifications to the preferences and settings of the user's mobile device 101. These modifications may include the direct downloading of software and/or content through various third party servers 105. In order to ensure that any software or content downloaded to an old mobile device is available to provision a new mobile device 101, the user's VSIM account must be updated with new triggers associated with the directly downloaded software and/or content. Referring to FIG. 9, a user may download a software application and/or content from a third party server 105, step 291. In response to the user's request to initiate the software application and/or content download, a trigger request may be created, step 292. The trigger request may contain all necessary information to enable the mobile device 101 or the VSIM server 102 to subsequently retrieve the downloaded application and/or content. This necessary information may include the third party server URL address, user account identification and authentication credential, identifiers for the specific software application and/or content downloaded, etc. The trigger request may be created before the download of software and/or content is complete or even initiated. In some instances, the mobile device 101 may create the trigger request prior to actually performing the download procedure. In other instances, the trigger request may be created after the download procedure is complete. In still other instances, the creation of the trigger request may occur concurrently with the download procedure. Once the trigger request is created, the trigger request is stored to the VSIM internal memory unit, step 293. Once stored, the trigger request will remain in the VSIM internal memory unit until the next time the mobile device 101 establishes a connection with the VSIM server 102 as part of a backup, restore, modify procedure as shown in FIG. 4, step 261. Whenever the backup, restore, modify procedure (FIG. 4, step 261) occurs, the mobile device 101 may transmit any trigger requests stored in the VSIM internal memory unit to the VSIM server 102 for storage in the user's VSIM account, step 295.

Figure 10:
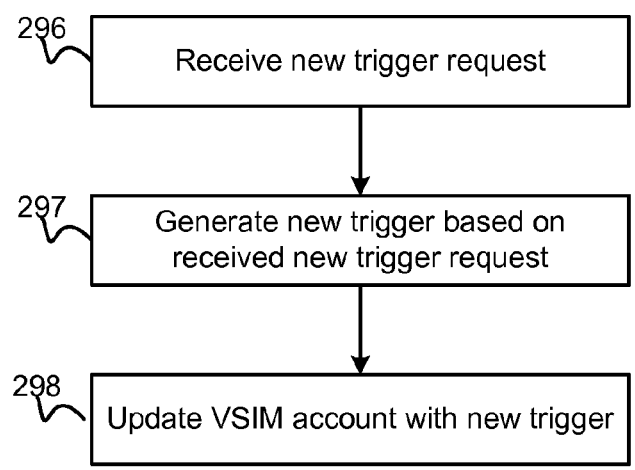
FIG. 10 is a process flow diagram illustrating steps that may be taken by a VSIM server to update a user's VSIM account with triggers to reflect newly downloaded software applications and/or content.

FIG. 10 is a process flow diagram illustrating steps that may be taken by a VSIM server to update a user's VSIM account with triggers to reflect newly downloaded software applications and/or content. In instances where a user has modified the mobile device's preferences and settings by directly downloading software applications and/or data, a trigger request will be created and stored in the mobile device's VSIM internal memory unit. In any subsequent VSIM activation, backup or restore process (FIG. 4, step 261), the VSIM server 102 may receive the trigger request as part of that process, step 296. As described above, the received trigger request may contain all necessary information to enable the VSIM server 102 or the mobile device 101 to subsequently retrieve the downloaded application and/or content, including for example the third party server URL address, user account identification and authentication credential, identifiers to identify the specific software application and/or content downloaded, etc. Using information in the received trigger request, the VSIM server 102 may generate a new trigger associated with the trigger request, step 297, which can be stored in the user's VSIM account, step 298. Thus, in any subsequent VSIM activation procedure, all of the user's preferences and settings including downloaded software applications and/or content may be provisioned to the user's new mobile device 101.

Figure 11:
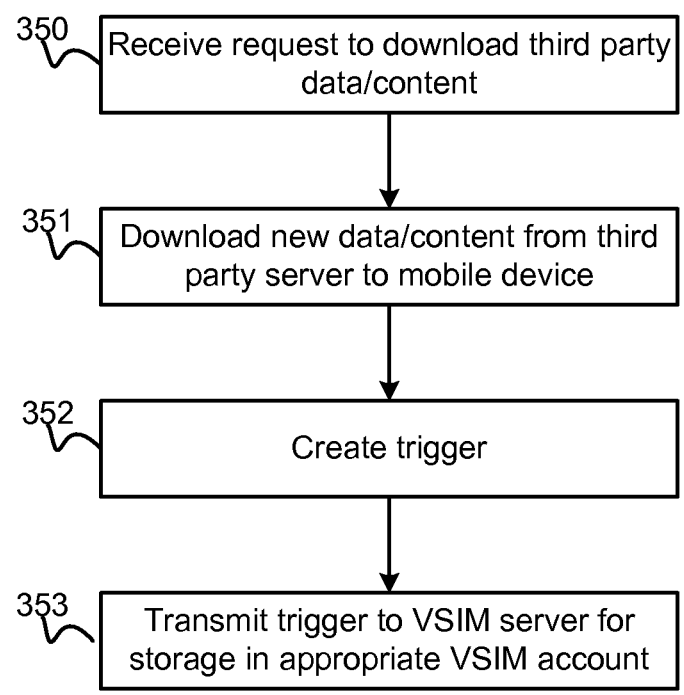
FIG. 11 is a process flow diagram illustrating steps that may be taken by a third party server to update a user's VSIM account with triggers to reflect newly downloaded software applications and/or content.

FIG. 11 is a process flow diagram of an alternative embodiment method that may be implemented by a third party server 105 to generate a new trigger in the VSIM account. A user may download software and/or content from a third party server 105 by transmitting a download request to the third party server 105. In addition to transmitting information necessary to effectuate the download to the mobile device 101, the download request may include information regarding the user's VSIM account. Such VSIM account information may include, for example, VSIM server URL, VSIM account identifiers, VSIM account authentication credentials, or any other information necessary to access and update a user's VSIM account. This information may received by the third party server 105 when the download request is received, step 350. Alternatively, the VSIM account information may be received in a separate transmission (not shown). In response to receiving the download request the third party server 105 may then download (upload) the requested application and/or content to the mobile device 101, step 351. Additionally, the third party server 105 may create a trigger containing all necessary information to enable the mobile device 101 or the VSIM server 102 to subsequently retrieve the downloaded application and/or content from the third party server 105, step 352. This trigger may be transmitted to the VSIM server 102 for storage in the user's VSIM account using the relevant VSIM account information transmitted by the mobile device 101 to the third party server in the download request, step 353. It should be noted that the trigger may be alternatively generated (step 352) prior to, concurrently with, or subsequent to downloading/uploading the application and/or content data to the mobile device 101 (step 351). In addition, the trigger may be transmitted to the VSIM server (step 353) prior to, concurrently with, or subsequent to the downloading/uploading the application and/or content data to the mobile device 101 (step 351).

In another embodiment, the third party server 105 may generate a trigger request similar to the trigger request generated in the embodiment method illustrated in FIG. 9 in response to a download request received from the mobile device 101. The trigger request may be transmitted to the VSIM server 102 from the third party server 105 similar to FIG. 9, step 295. As a result, the VSIM server 102 may implement the process flow illustrated in FIG. 10 to receive the trigger request from the third party server 105 instead of the mobile device 101. Similarly, in instances where the mobile device 101 possesses sufficient processing power, the mobile device 101 may generate the actual trigger similar to the process flow illustrated in the FIG. 11. Thus, the VSIM server 102 may receive the trigger from the mobile device 101 instead of the third party server 105.

Figure 12:
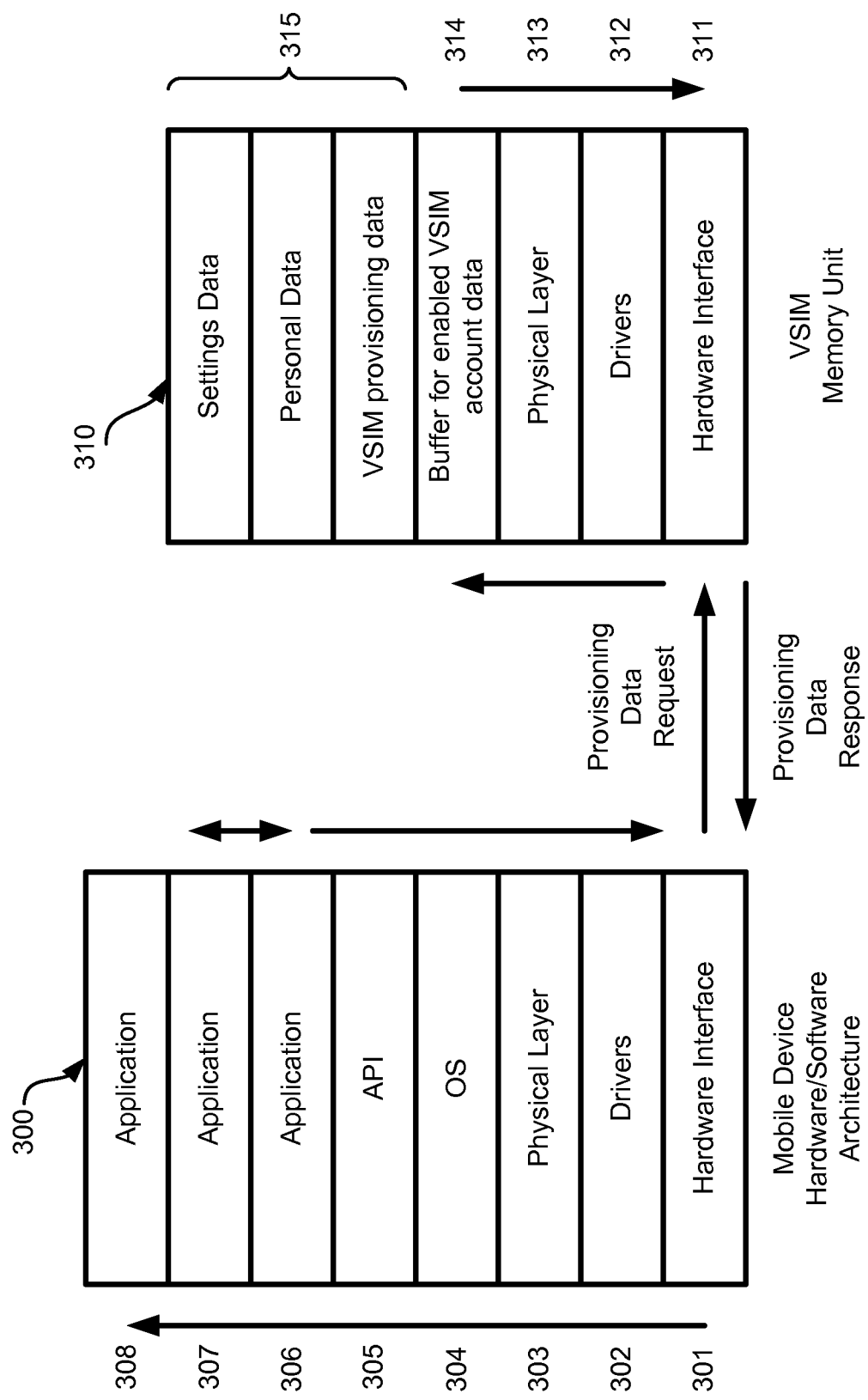
FIG. 12 is a hardware/software architecture diagram of the mobile device and VSIM illustrating the flow of data in a provisioning data request and response.

FIG. 12 illustrates a mobile device hardware/software architecture 300 that includes a VSIM memory unit 310. When the mobile device 101 is functioning, various applications 306-308 operate on or request services from the mobile device's various hardware elements. For example, these hardware elements may include the processor and internal memory, input elements such as a keyboard or microphone, output elements such as the display or speaker (none shown) and communication units such as cellular transceivers, Global Positioning System (GPS) receivers, WiFi wireless transceivers, and Bluetooth local wireless transceivers. For example, an application (e.g., 308) may access the mobile device's cellular transceiver to initiate a telephone or data call. In order to initiate a telephone or data call, the application 308 will need to access the provisioning data stored in the VSIM memory unit 193. The application 308 requests this provisioning data through the hardware/software architecture 300 and 310. As illustrated in FIG. 7, application 308 may communicate with the device operating system 304 via an API layer 305. The API layer 305 contains code that an operating system 304 provides to support requests for processor services to be made of it by the application 308. The operating system 304 performs basic tasks such as controlling and allocating memory, prioritizing system requests, controlling input and output devices, facilitating networking and managing file systems. The operating system 304 communicates with the various device resources via the physical layer 303. The one or more driver layers 302 may be provided to control various device elements such as connected modems or transceivers. The hardware interface 301 comprises the physical connections with the hardware device such as the socket or receptacle that the hardware element plugs into.

In the various embodiments, when an application 308 running on a mobile device 101 requests provisioning data stored in the VSIM memory 315, the data request propagates through the device hardware/software architecture 300 to the hardware interface layer 301 which communicates with the VSIM memory unit 310 via the VSIM memory interface 311. This data access request may be by direct memory access and/or General Purpose Input/Output (GPIO). The VSIM hardware interface layer 311 may comprise connector pins which may be the physical connection plugging the VSIM 193 into the mobile device 101, or it may be the bus connection to which the VSIM 193 is connected when the VSIM is built into the internal memory 192 of the mobile device 101. Once received in the VSIM hardware layer 311, the request for the provisioning data corresponding to the currently active VSIM service contract in the VSIM memory 314 that originated in the application 308 propagates up the VSIM memory unit hardware/software architecture 310. The driver 302 accesses the VSIM data via the hardware interface 311 and provides the information to the requesting application 308. Alternatively, the data request is communicated from the hardware interface 311 to the driver layer 312. The data request may accesses data in an enabled VSIM account data buffer 314, which is a memory block used to hold the provisioning data for the service provider currently selected for use. As a result, the currently selected VSIM account data 314 is accessed and the requested information passed back to the requesting application 308 in a reverse manner. The VSIM account data buffer 314 may be an implementation of an embedded file system or secured file system. The embedded file system provides the operating system (OS) abstraction to access the VSIM data as a logical file. A secured file system provides an additional level of protection against spoofing of VSIM data through software or hardware encryption.

As described above, the VSIM memory unit 193 may contain a plurality of VSIM service contract account provisioning data sets for different VSIM service contract accounts purchased by the user, as well as a user's personal data files which may contain text, application, media, etc. data as well as preferences and settings for all of the user's mobile device preference settings. When the user activates a VSIM account, the mobile device processor 191 accesses the VSIM account data in including provisioning data, personal data and settings data 315 via the access layers 311-313 as described above and copies the provisioning data into the enabled VSIM account data buffer 314. Thereafter, access requests received from applications may be provided VSIM account data from the enabled VSIM account data buffer 314.

In an embodiment method, an application 306 may be a content management application which may in turn control a number of different applications (e.g., 307) operating on the mobile device 101. In addition, the control management application may control general preferences and settings of the mobile device 101. When the mobile device 101 receives an instruction and data message from the VSIM server 102, the mobile device 101 may launch the content management application 306. The content management application 306 may utilize the received instructions and data to control another application 307 operating on the mobile device 101. The content management application 306 may alter settings controlling the application 307 in accordance with the received instructions and data.

The hardware/software architecture 300 and 310 illustrated in FIG. 12 is meant only as an illustration of one example organization of data and software for implementing the various embodiments. As will be appreciated by one of skill in the art of cellular handheld device design and programming, other software/hardware architectures may be used with equal effectiveness.

Figure 13:
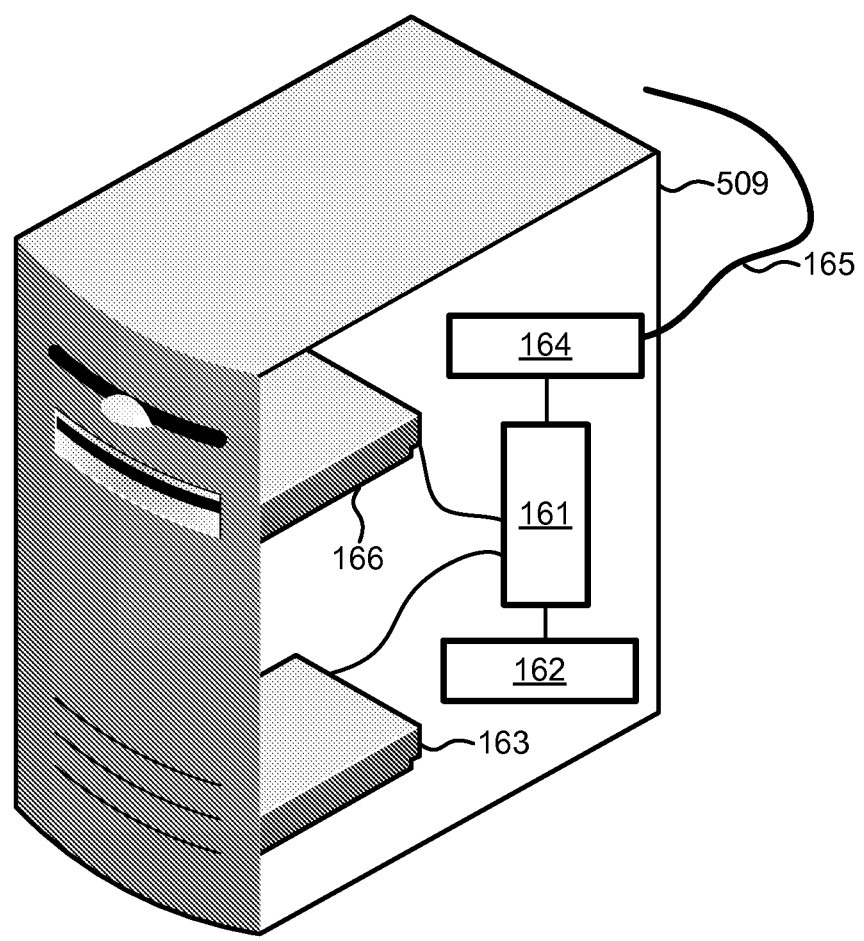
FIG. 13 is a component block diagram of an example server suitable for use with the various embodiments.

Server portions of the embodiments described above may be implemented on any of a variety of server systems such as illustrated in FIG. 13. Such a server 509 typically includes a processor 161 coupled to volatile memory 162 and a large capacity nonvolatile memory, such as a disk drive 163. The processor 161 is coupled to one or more network interface circuits, such as high speed modems 164 coupled to a network 165 such as the Internet. The computer 160 may also include a portable media reader, such as a compact disc (CD) drive 166 coupled to the processor 161.

The hardware used to implement the foregoing embodiments may be processing elements and memory elements configured to execute a set of instructions, wherein the set of instructions are for performing method steps corresponding to the above methods. Alternatively, some steps or methods may be performed by circuitry that is specific to a given function.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order.

The hardware used to implement the foregoing embodiments may be processing elements and memory elements configured to execute a set of instructions, including microprocessor units, microcomputer units, programmable floating point gate arrays (FPGA), and application specific integrated circuits (ASIC) as would be appreciated by one of skill in the art, wherein the set of instructions are for performing method steps corresponding to the above methods. Alternatively, some steps or methods may be performed by circuitry that is specific to a given function.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. The software module may reside in a processor readable storage medium and/or processor readable memory both of which may be any of RAM memory, flash memory, ROM memory, EPROM memory, EEPROM memory, registers, hard disk, a removable disk, a CD-ROM, or any other tangible form of data storage medium known in the art. Moreover, the processor readable memory may comprise more than one memory chip, memory internal to the processor chip, in separate memory chips, and combinations of different types of memory such as flash memory and RAM memory. References herein to the memory of a mobile handset are intended to encompass any one or all memory modules within the mobile handset without limitation to a particular configuration, type or packaging. An exemplary storage medium is coupled to a processor in either the mobile handset or the theme server such that the processor can read information from, and write information to, the storage medium. In the alternative, the storage medium may be integral to the processor. The processor and the storage medium may reside in an ASIC.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

We claim:

1. A method for provisioning a mobile device having a Virtual Subscriber Identity Module (VSIM) internal memory unit, comprising:
   establishing a communication link between the mobile device and a VSIM server;
   authenticating a third party server that is external to an operator network of the mobile device and which is indicated by a VSIM account identified by the mobile device and establishing a secured communications link between the VSIM server and the authenticated third party server;
   downloading provisioning data from the VSIM server to the mobile device;
   transmitting a VSIM activation message to the authenticated third party server from the VSIM server;
   transmitting provisioning instructions from the authenticated third party server to the VSIM server; and
   forwarding the provisioning instructions to the mobile device from the VSIM server.

2. The method of claim 1, further comprising:
   establishing an end-to-end connection between the mobile device and the authenticated third party server;
   downloading a third party data file from the authenticated third party server to the mobile device; and
   terminating the end-to-end connection and communication link.

3. The method of claim 2, further comprising:
   launching a content management agent by the mobile device in response to receipt of the third party data file and the provisioning instructions; and
   completing provisioning of a third party application by the content management agent executing received instructions and using the received third party data file.

4. The method of claim 2, wherein the provisioning instructions comprise an address to be used to establish the end-to-end connection between the mobile device and the authenticated third party server.

5. The method of claim 2, further comprising transmitting an indication that the downloading of the third party data file is complete from the authenticated third party server to the VSIM server.

6. The method of claim 2, further comprising forwarding an indication that the downloading of the third party data file is complete from the VSIM server to the mobile device.

7. The method of claim 2, further comprising:
   creating a trigger request in the mobile device when data is downloaded from the authenticated third party server to the mobile device; and
   transmitting the trigger request from the mobile device to the VSIM server, wherein said trigger request contains all necessary data to enable the VSIM server to generate a trigger in a user's VSIM account.

8. The method of claim 1, wherein the provisioning instructions comprise an executable script.

9. The method of claim 1, wherein the provisioning instructions comprise an authentication token.

10. The method of claim 1, wherein the provisioning instructions comprise a user authentication credential for accessing a third party webpage.

11. The method of claim 1, wherein the provisioning instructions comprise a private electronic authentication certificate.

12. A system for provisioning a mobile device having a Virtual Subscriber Identity Module (VSIM) internal memory unit, comprising:
   means for establishing a communication link between the mobile device and a VSIM server;
   means for authenticating a third party server that is external to an operator network of the mobile device and which is indicated by a VSIM account identified by the mobile device and establishing a secured communications link between the VSIM server and the authenticated third party server;
   means for downloading provisioning data from the VSIM server to the mobile device;
   means for transmitting a VSIM activation message to the authenticated third party server from the VSIM server;
   means for transmitting provisioning instructions from the authenticated third party server to the VSIM server; and
   means for forwarding the provisioning instructions to the mobile device from the VSIM server.

13. The system of claim 12, further comprising:
   means for establishing an end-to-end connection between the mobile device and the authenticated third party server;
   means for downloading a third party data file from the authenticated third party server to the mobile device; and
   means for terminating the end-to-end connection and communication link.

14. The system of claim 13, further comprising:
   means for launching a content management agent by the mobile device in response to receipt of the third party data file and the provisioning instructions; and
   means for completing provisioning of a third party application by the content management agent executing received instructions and using the received third party data file.

15. The system of claim 13, further comprising means for transmitting an indication that the means for downloading of the third party data file has completed its download from the authenticated third party server to the VSIM server.

16. The system of claim 13, further comprising means for forwarding an indication that the means for downloading of the third party data file has completed its download from the VSIM server to the mobile device.

17. The system of claim 13, further comprising:
   means for creating a trigger request in the mobile device when data is downloaded from the authenticated third party server to the mobile device; and
   means for transmitting the trigger request from the mobile device to the VSIM server, wherein said trigger request contains all necessary data to enable the VSIM server to generate a trigger in a user's VSIM account.

18. The system of claim 12, wherein the provisioning instructions comprise an executable script.

19. The system of claim 12, wherein the provisioning instructions comprise an authentication token.

20. The system of claim 12, wherein the provisioning instructions comprise a user authentication credential for accessing a third party webpage.

21. The system of claim 12, wherein the provisioning instructions comprise a private electronic authentication certificate.

22. The system of claim 12, wherein the provisioning instructions comprise an address to be used to establish the end-to-end connection between the mobile device and the authenticated third party server.

* * * * *